(12) United States Patent
Jung et al.

(10) Patent No.: US 11,206,546 B2
(45) Date of Patent: Dec. 21, 2021

(54) METHOD AND APPARATUS FOR OCCUPYING CHANNEL OF UNLICENSED BAND IN WIRELESS COMMUNICATION SYSTEM

(71) Applicants: Samsung Electronics Co., Ltd., Suwon-si (KR); Seoul National University R&DB Foundation, Seoul (KR)

(72) Inventors: Byounghoon Jung, Suwon-si (KR); Seunghoon Park, Suwon-si (KR); Jaehong Yi, Seoul (KR); Sunghyun Choi, Seoul (KR); Jihoon Kim, Seongnam-si (KR); Kangjin Yoon, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 79 days.

(21) Appl. No.: 16/532,296

(22) Filed: Aug. 5, 2019

(65) Prior Publication Data
US 2020/0053570 A1 Feb. 13, 2020

(30) Foreign Application Priority Data
Aug. 8, 2018 (KR) .......................... 10-2018-0092676

(51) Int. Cl.
*H04W 16/14* (2009.01)
*H04W 72/04* (2009.01)
(Continued)

(52) U.S. Cl.
CPC .......... *H04W 16/14* (2013.01); *H04W 28/26* (2013.01); *H04W 52/367* (2013.01);
(Continued)

(58) Field of Classification Search
CPC ... H04W 16/14; H04W 28/26; H04W 52/367; H04W 72/0446; H04W 72/0473;
(Continued)

(56) References Cited

U.S. PATENT DOCUMENTS

| | | | |
|---|---|---|---|
| 2014/0079016 A1* | 3/2014 | Dai ................... | H04W 72/0446 370/330 |
| 2015/0111609 A1* | 4/2015 | Koutsimanis ....... | H04W 52/225 455/522 |

(Continued)

*Primary Examiner* — Omer S Mian
*Assistant Examiner* — Bao G Nguyen

(57) ABSTRACT

Provided is a method of occupying a channel in a wireless communication system that supports an unlicensed band. The method comprising detecting an earlier point among a first point at which transmission of a first subframe in a first channel is completed and a second point at which a busy state of a second channel is terminated. The method further comprising determining a type of a second subframe based on at least one of a result of the detecting or first transmit power for the first channel, transmitting the second subframe of the determined type in the first channel after transmission of the first subframe is completed, and transmitting a third subframe in the first channel and a fourth subframe in the second channel, after transmission of the second subframe is completed.

16 Claims, 17 Drawing Sheets

(51) Int. Cl.
*H04W 74/08* (2009.01)
*H04W 28/26* (2009.01)
*H04W 52/36* (2009.01)

(52) U.S. Cl.
CPC ... *H04W 72/0446* (2013.01); *H04W 72/0473* (2013.01); *H04W 74/0808* (2013.01)

(58) Field of Classification Search
CPC . H04W 74/0808; H04W 52/04; H04W 52/38; H04W 74/0816; H04L 27/0006; H04L 5/001; H04L 5/0062
See application file for complete search history.

(56) References Cited

U.S. PATENT DOCUMENTS

| | | | |
|---|---|---|---|
| 2018/0069685 A1* | 3/2018 | Yang | H04W 52/242 |
| 2019/0045458 A1* | 2/2019 | Harada | H04W 72/04 |
| 2019/0082474 A1 | 3/2019 | Jung et al. | |
| 2019/0190668 A1* | 6/2019 | Lei | H04W 74/085 |

* cited by examiner

FIG. 4
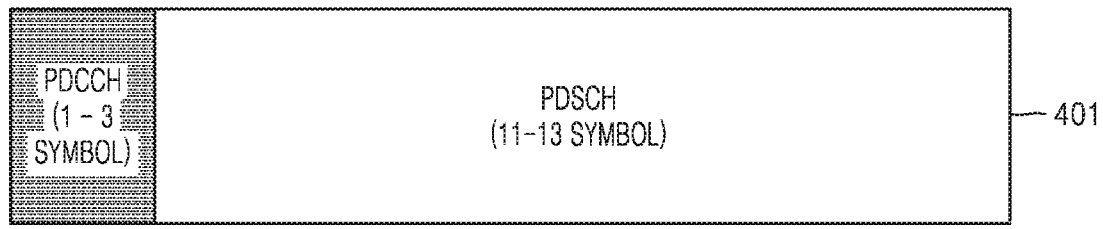
FULL SUBFRAME STRUCTURE IN LAA DOWNLINK
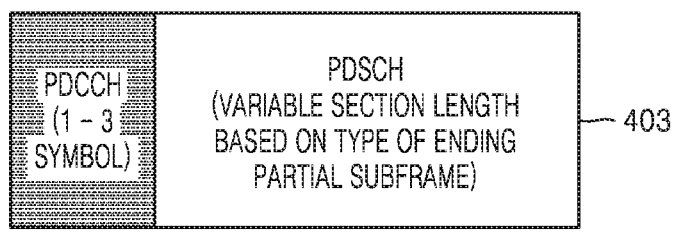
ENDING PARTIAL SUBFRMAE STRUCTURE IN LAA DOWNLINK
FIG. 5
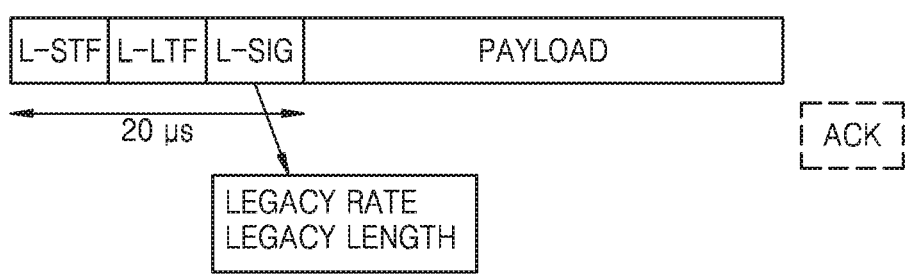

METHOD AND APPARATUS FOR OCCUPYING CHANNEL OF UNLICENSED BAND IN WIRELESS COMMUNICATION SYSTEM

CROSS-REFERENCE TO RELATED APPLICATION

This application is based on and claims priority under 35 U.S.C. § 119 to Korean Patent Application No. 10-2018-0092676, filed on Aug. 8, 2018, in the Korean Intellectual Property Office, the disclosure of which is incorporated by reference herein in its entirety.

BACKGROUND

1. Field

The disclosure relates to a communication method in a wireless communication system, and more particularly, to a communication method in an unlicensed band.

2. Description of Related Art

To meet the demand for ever-increasing wireless data traffic because commercialization of the 4G communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. Implementation of the 5G communication system using ultra-frequency (mmWave) bands, e.g., 60 giga hertz (GHz) bands, is considered to attain higher data rates. To reduce propagation loss of radio waves and increase a transmission range in the ultra-frequency bands, beamforming, massive multiple-input multiple-output (MIMO), full dimensional MIMO (FD-MIMO), array antenna, analog beamforming, and large-scale antenna techniques are under discussion. To improve system networks, technologies for advanced small cells, cloud Radio Access Networks (RANs), ultra-dense networks, device to device (D2D) communication, wireless backhaul, moving networks, cooperative communication, Coordinated Multi-Points (CoMP), reception-end interference cancellation and the like are also being developed in the 5G communication system. In addition, in the 5G system, an advanced coding modulation (ACM), e.g., hybrid FSK and QAM modulation (FQAM), sliding window superposition coding (SWSC), and an advanced access technology, e.g., filter bank multi carrier (FBMC), non-orthogonal multiple access (NOMA), and sparse code multiple access (SCMA), are being developed.

In the meantime, the Internet is evolving from a human-centered connectivity network where humans generate and consume information into an Internet of Things (IoT) network where distributed entities such as devices and appliances send, receive and process information without human intervention. Internet of Everything (IoE) technologies, in which a big data processing technology through connection with a cloud server, for example, is combined with the IoT technology, have also emerged. To implement IoT, various technologies, such as sensing technology, wired/wireless communication and network infrastructure, service interfacing technology, and security technology are required, and recently, even technologies for sensor networks, Machine to Machine (M2M) communication, Machine Type Communication (MTC) for connection between things are being studied. In the IoT environment, intelligent Internet Technology (IT) services that create new values for human life by collecting and analyzing data generated from connected things may be provided. IoT may be applied to a variety of areas, such as smart home, smart building, smart city, smart car or connected car, smart grid, health care, smart home appliances and advanced medical services through convergence and combination between existing Information Technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, and array antenna schemes, etc. Even application of a cloud Radio Access Network (cloud RAN) as the aforementioned big data processing technology may be seen as an example of convergence of 5G and IoT technologies.

With the rapid growth of wireless communication traffic, securing wider frequency bands is becoming an urgent issue. Hence, in various communication systems, to use each communication system, a scheme to perform wireless communication using frequencies from not only a licensed band (L-band) but also an unlicensed band (U-band) is being discussed.

SUMMARY

Provided is a method of performing wireless communication by using an unlicensed band.

Additional aspects will be set forth in part in the description which follows and, in part, will be apparent from the description, or may be learned by practice of the presented embodiments of the disclosure.

According to an embodiment of the disclosure, a method for occupying a channel in a wireless communication system that supports an unlicensed band includes detecting an earlier point among a first point at which transmission of a first subframe in a first channel is completed and a second point at which a busy state of a second channel is over; determining a type of a second subframe based on at least one of the detection result or first transmit power for the first channel; transmitting the second subframe of the determined type in the first channel after transmission of the first subframe is completed; and transmitting a third subframe in the first channel and a fourth subframe in the second channel, after transmission of the second subframe is completed.

According to another embodiment of the disclosure, a base station for transmitting or receiving data in a wireless communication system that supports an unlicensed band includes a transceiver; a memory storing a program; and a processor configured, when running the program, to detect an earlier point among a first point at which transmission of a first subframe in a first channel is completed and a second point at which a busy state of a second channel is over, determine a type of a second subframe based on at least one of the detection result or first transmit power for the first channel, transmit the second subframe of the determined type in the first channel after transmission of the first subframe is completed; and transmit a third subframe in the first channel and a fourth subframe in the second channel, after transmission of the second subframe is completed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates subframe structures used in long term evolution licensed assistant access (LTE-LAA), according to an embodiment of the disclosure.

FIG. 5 illustrates a configuration of a signal used in an wireless-fidelity (Wi-Fi) system, according to an embodiment of the disclosure.

DETAILED DESCRIPTION

Figure 1:
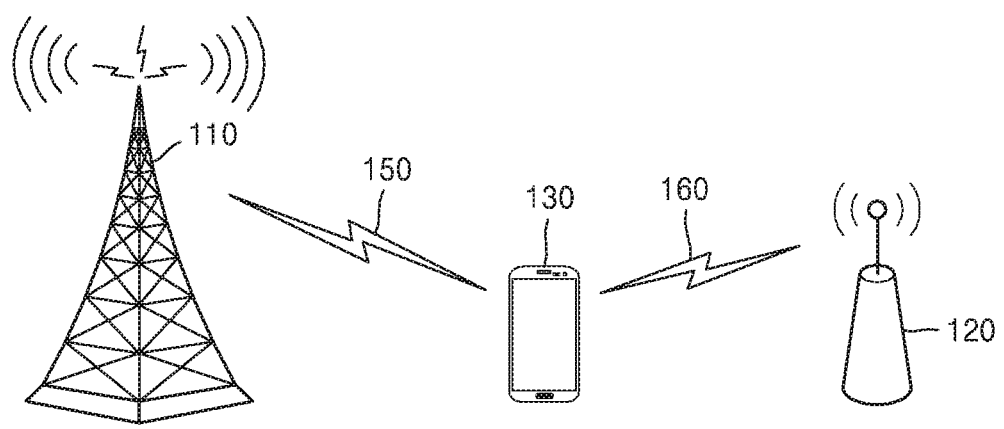
FIG. 1 illustrates an exemplary long term evolution (LTE) service system using an unlicensed band, according to an embodiment of the disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure will now be described with reference to the accompanying drawings.

Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments are provided so that this disclosure will be thorough and complete, and will fully convey the scope of the embodiments of the disclosure to those of ordinary skill in the art. Like numbers refer to like elements throughout the specification.

It will be understood that each block and combination of blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in alternate embodiments of the disclosure. For example, two successive blocks may be performed substantially at the same time or in reverse order.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a higher number of components and modules. Moreover, the components and modules may be implemented to execute one or more central processing units (CPUs) in a device or security multimedia card. In embodiments of the disclosure, the module may include one or more processors.

Operating principles of embodiments of the disclosure will now be described with reference to accompanying drawings. Descriptions of some well-known technologies that possibly obscure the invention will be omitted, when necessary. Further, terms, as will be mentioned later, are defined by taking functionalities of the disclosure into account, but may vary depending on certain practices or intentions of users or operators. Accordingly, the definition of the terms should be made based on the descriptions throughout this specification. In the following description, a base station is an entity for performing resource allocation for a terminal, and may be at least one of a gNode B, an eNode B, a base station (BS), a radio access unit, a base station controller, or a network node. A terminal may include user equipment (UE), a mobile station (MS), a cellular phone, a smart phone, a computer, or a multimedia system capable of communication. It is, of course, not limited thereto.

In the following description, the terms referring to broadcasting information, control information, state changes (e.g., events), network entities, messages, and components of an apparatus, terms related to communication coverages, etc., are mentioned for convenience of explanation. That is, the disclosure is not limited to the following terms, and may use different terms having the same meaning in a technological sense.

Some of the terms and names defined by the 3rd generation partnership project long term evolution (3GPP LTE) will be used hereinafter. The disclosure is not, however, limited to the aforementioned terms and definitions, and may equally apply to any systems that conform to other standards.

Wireless communication systems are evolving from early systems that provide voice-oriented services to broadband wireless communication systems that provide high data rate and high quality packet data services such as 3GPP high speed packet access (HSPA), long term evolution (LTE) or evolved universal terrestrial radio access (E-UTRA), LTE-advanced (LTE-A), LTE-Pro, 3GPP2 high rate packet data (HRPD), ultra mobile broadband (UMB), and IEEE 802.16e communication standards.

As a representative example of such a broadband wireless communication system, an LTE system adopts orthogonal frequency division multiplexing (OFDM) for downlink (DL) and single carrier frequency division multiple access (SC-FDMA) for uplink (UL). The UL refers to a radio link for a UE or MS to transmit data or a control signal to an eNode B or BS, and the DL refers to a radio link for a BS to transmit data or a control signal to a UE or MS. Such a multiple access scheme allocates and operates time-frequency resources for carrying data or control information for respective users not to overlap each other, i.e., to maintain orthogonality, thereby differentiating each user's data or control information.

A minimum transmission unit in the time domain is an OFDM symbol, N OFDM symbols may form a slot, and two slots may form a subframe. The slot may be about 0.5 ms long, and the subframe may be about 1.0 ms long.

In the meantime, an LTE system has used a licensed band assigned by the authorities, e.g., the government, for an operator, but recently, to meet the explosive traffic demand, using the LTE technology for unlicensed bands that are currently used for wireless local area network (WLAN), Bluetooth, etc., is being discussed, which is called a licensed-assisted access (LAA) technology.

The unlicensed bands may refer to communication frequency bands that anyone can use, such as the 2.4 GHz band, the 5 GHz band, etc. The unlicensed band may be a relative concept to the licensed band of frequencies allowed for mobile communication. The unlicensed bands are not, however, limited thereto, and may include other frequency bands which differ by countries, policies, etc.

Unlike the communication technology based on licensed bands, the unlicensed band-based communication technology has various coexistent technologies, so there may be many constraints in using the unlicensed band. One of the constraints is to perform a Listen Before Talk (LBT) operation. The LBT operation refers to an operation to check whether a channel is empty before the channel is used.

A communication node, e.g., a BS, UE, etc., in a wireless communication network may transmit a signal based on the LBT operation in an unlicensed band. The communication node may determine an occupancy state of the unlicensed band by performing an operation of energy detection. When determining that the unlicensed band is in an idle state, the communication node may transmit a signal. For example, the communication node may transmit a signal when the unlicensed band is in the idle state for a contention window (CW) resulting from a back-off operation. On the other hand, when determining that the unlicensed band is busy, the communication node may not transmit a signal.

Among the licensed band communication technologies, Wi-Fi and LTE-LAA are typical technologies to perform the LBT operation. IEEE 802.11ax may use 160 MHz channel bandwidth for Wi-Fi through a channel bonding technology, and use 640 MHz channel bandwidth for LTE-LAA through a carrier aggregation (CA) technology.

Although the following embodiments of the disclosure will focus on the LTE-LAA or Wi-Fi system as an example, they may be applied to other communication systems with similar technical backgrounds or channel types. Furthermore, embodiments of the disclosure will also be applied to different communication systems with some modifications to an extent that does not significantly deviate from the scope of the disclosure when judged by those of ordinary skill in the art.

The disclosure will now be described with reference to the accompanying drawings.

FIG. 1 illustrates an exemplary LTE service system using an unlicensed band.

In an embodiment of the disclosure, a UE 130 may receive a service from a licensed band BS 110 in a licensed band. For traffic offloading, the UE 130 may receive a service from an unlicensed band BS 120 in an unlicensed band.

In an embodiment of the disclosure, the licensed band BS 110 supports LTE systems, while the unlicensed band BS 120 may support many different communication systems such as Wi-Fi in addition to the LTE system. The licensed band BS 110 and the unlicensed band BS 120 may be coupled in a carrier aggregation (CA) environment, in which case a particular cell of the licensed band BS 110 may be a primary cell (PCell). Alternatively, the licensed band BS 110 and the unlicensed band BS 120 may be coupled in a dual connectivity environment, in which case a particular cell of the licensed band BS 110 may be a PCell. In general, the licensed band BS 110 having the PCell has wider coverage than that of the unlicensed band BS 120. The licensed band BS 110 may be referred to as a macro cell. The unlicensed band BS 120 may be called a small cell, femtocell, or micro cell. The licensed band BS 110 may operate the PCell, and zero or more secondary cells (SCells). The unlicensed band BS 120 may operate one or more SCells. The SCells may be activated or inactivated under the instruction of a PCell. The aforementioned features are only examples, and in some other embodiments of the disclosure, the licensed band BS 110 and the unlicensed band BS 120 may correspond to a PCell and an SCell, respectively, which may be managed by a single BS.

The licensed band guarantees exclusive use for a particular communication protocol or operator. The unlicensed band allows coexistence of various communication protocols and guarantees shared use thereof. The unlicensed band may include a 2.5 GHz and/or 5 GHz band that a WLAN uses.

Basically in the unlicensed band, it is assumed that a channel is secured by contention between respective communication nodes. Accordingly, for communication in the unlicensed band, performing channel sensing is required to confirm that the other communication node is not transmitting a signal. This is called an LBT for convenience sake, and an occasion when it is determined that the other communication node is not transmitting a signal is defined as clear channel assessment (CCA) confirmed.

A BS or UE in the LTE system needs to perform the LBT first to access a channel in the unlicensed band. Furthermore, other communication nodes such as Wi-Fi BSs also perform the LBT while the BS or a wireless device in the LTE system transmits a signal, so there may be an interference issue.

'Perform(s) or performing an (or the) LBT' or 'perform(s) or performing a (or the) CCA', as will be mentioned below, refers to accessing a channel after determining whether the channel is in an idle state or whether the channel is being used by another node.

In the following description, LTE-LAA and Wi-Fi will be taken as an illustration of communication systems used in the unlicensed band. In practice, what is described in the disclosure will be applied to common wireless communication systems as well as to the LTE-LAA and Wi-Fi.

A cell or carrier that operates in the unlicensed band will be referred to herein as an unlicensed cell or unlicensed carrier. A cell or carrier operating in the licensed band will be called a licensed cell or licensed carrier.

The disclosure will mainly focus on a downlink from a BS to a UE, but the description about the downlink in the disclosure may be equally applied to an uplink from a UE to a BS. Furthermore, descriptions of the BS will be all equally applied to the EU.

A channel as referred to herein may include at least one carrier. Specifically, a channel may correspond to one or multiple carriers.

Figure 2:
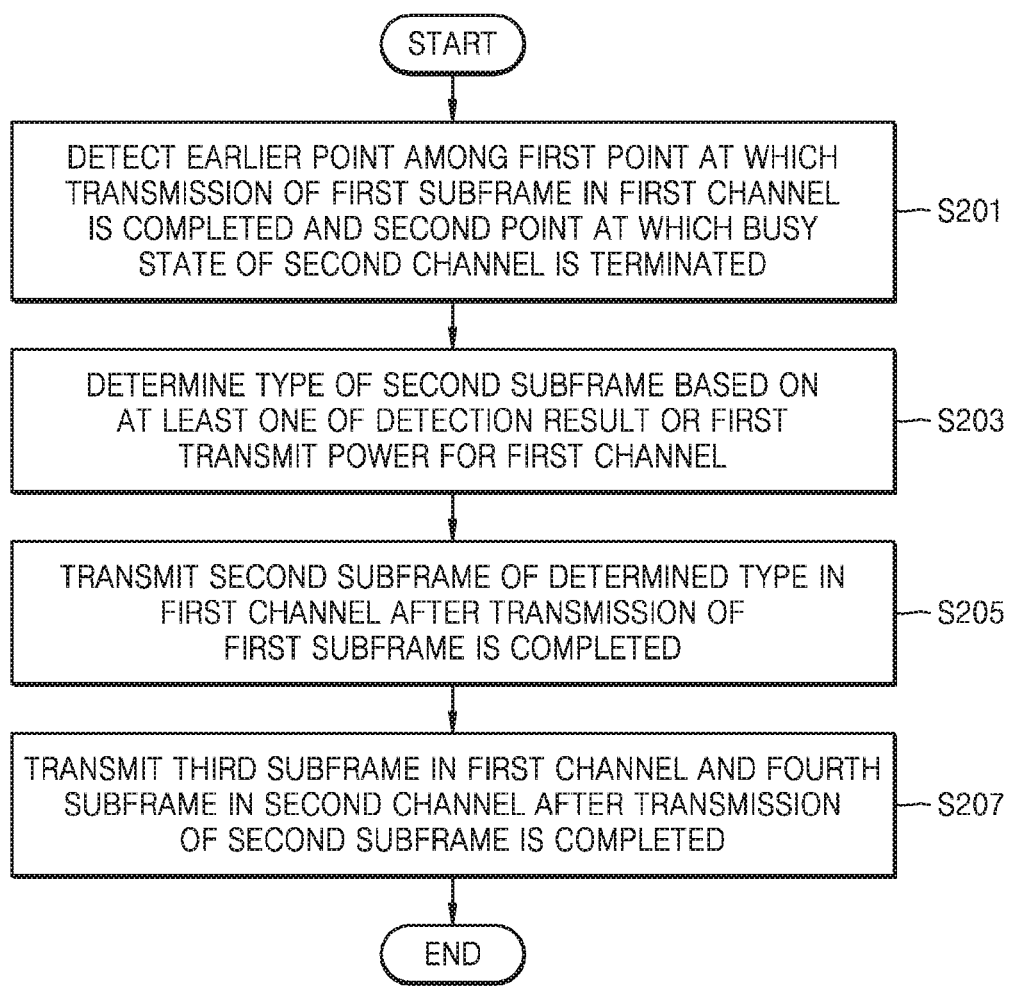
FIG. 2 illustrates a flowchart of a method for occupying a channel, according to an embodiment of the disclosure.

FIG. 2 illustrates a flowchart of a method for occupying a channel, according to an embodiment of the disclosure.

In operation S201, a BS according to an embodiment of the disclosure detects an earlier point among a first point at which transmission of a first subframe in a first channel is completed and a second point at which a busy state of a second channel is terminated. The first and second channels may each correspond to multiple carriers. In a case that a type of a wireless communication system is LTE-LAA, the second point at which the busy state of the second channel is terminated may be a point at which the second channel is turned from the busy state into an idle state. In a case that a type of the wireless communication system is Wi-Fi, the second point at which the busy state of the second channel is terminated may be a point at which even acknowledgment (ACK) transmission is completed after the second channel is turned from the busy state to the idle state.

In operation S203, the BS determines a type of a second subframe based on at least one of a result of the detecting or first transmit power for the first channel.

Specifically, the BS may determine a subframe shorter than the first subframe to be the second subframe when the first transmit power for the first channel is equal to a maximum transmit power of the BS. The BS may determine a subframe equal in length to the first subframe to be the second subframe when the first transmit power for the first channel is smaller than the maximum transmit power of the BS.

Taking an example of the maximum transmit power of the BS, based on the European Telecommunications Standards Institute (ETSI) that defines regulations on unlicensed band wireless communication technologies, a maximum transmit power for 5.15 GHz to 5.35 GHz band may be about 23 dBm. The maximum transmit power may be variously set based on transmitting entities and band types. Furthermore, in an embodiment of the disclosure, the BS may not always output a signal at the maximum transmit power.

When the first transmit power for the first channel is equal to the maximum transmit power of the BS, and the second point is earlier than the first point, the BS may calculate an end point of a back-off operation for the second channel to determine a type of the second subframe.

When the first transmit power for the first channel is equal to the maximum transmit power of the BS, and the first point is earlier than the second point, the BS may predict a point at which the busy state of the second channel is terminated. Furthermore, the BS may calculate the end point of the back-off operation for the second channel, and based on the predicted point and the calculated point, determine a type of the second subframe.

In an embodiment of the disclosure, the BS may determine second transmit power based on the first transmit power for the first channel. When the first transmit power is equal to the maximum transmit power of the BS, the BS may determine the second transmit power to be smaller than the maximum transmit power. When a channel is additionally occupied while data is sent at the maximum transmit power, overall transmission intensity may be constant but transmission intensity for each channel may be changed.

When data is sent at the maximum transmit power, it is possible to occupy a single channel and not possible to occupy two or more channels simultaneously. When a change in transmit power is made during the transmission to occupy two or more channels at the same time, the receiving end is unable to receive data. Accordingly, to occupy two or more channels at the same time, the transmit power needs to be reduced below the maximum transmit power and data transmission needs to be temporarily stopped.

Hence, for the BS to occupy an additional channel when the first transmit power is equal to the maximum transmit power, the BS needs to transmit data at transmit power smaller than the maximum transmit power. On the contrary, when the first transmit power is smaller than the maximum transmit power of the BS, the BS may determine the second transmit power to be equal to the first transmit power.

In an embodiment of the disclosure, a type of the second subframe may be differently determined even based on the type of the wireless communication system. When the type of the wireless communication system is LTE-LAA, the second subframe may be one of an ending partial subframe and a punctured subframe. The ending partial subframe and the punctured subframe will be described in detail later in connection with FIG. 4.

In operation S205, the BS transmits the second subframe of the determined type in the first channel after transmission of the first subframe is completed. Depending on the type of the second subframe determined in the operation S203, the length of the second subframe may be equal to or shorter than the length of the first subframe. As described above, when the first transmit power is smaller than the maximum transmit power of the BS, the second subframe may be equal in length to the first subframe. On the other hand, when the first transmit power is equal to the maximum transmit power of the BS, the second subframe may be shorter than the first subframe.

In operation S207, the BS transmits a third subframe in the first channel and a fourth subframe in the second channel after transmission of the second subframe is completed. The third and fourth subframes may be equal in length. The BS may transmit the third and fourth subframes at the same points of time. In some embodiments of the disclosure, the same points of time may refer to points on the boundary of the same subframe or within a certain range from the same subframe.

Figure 3:
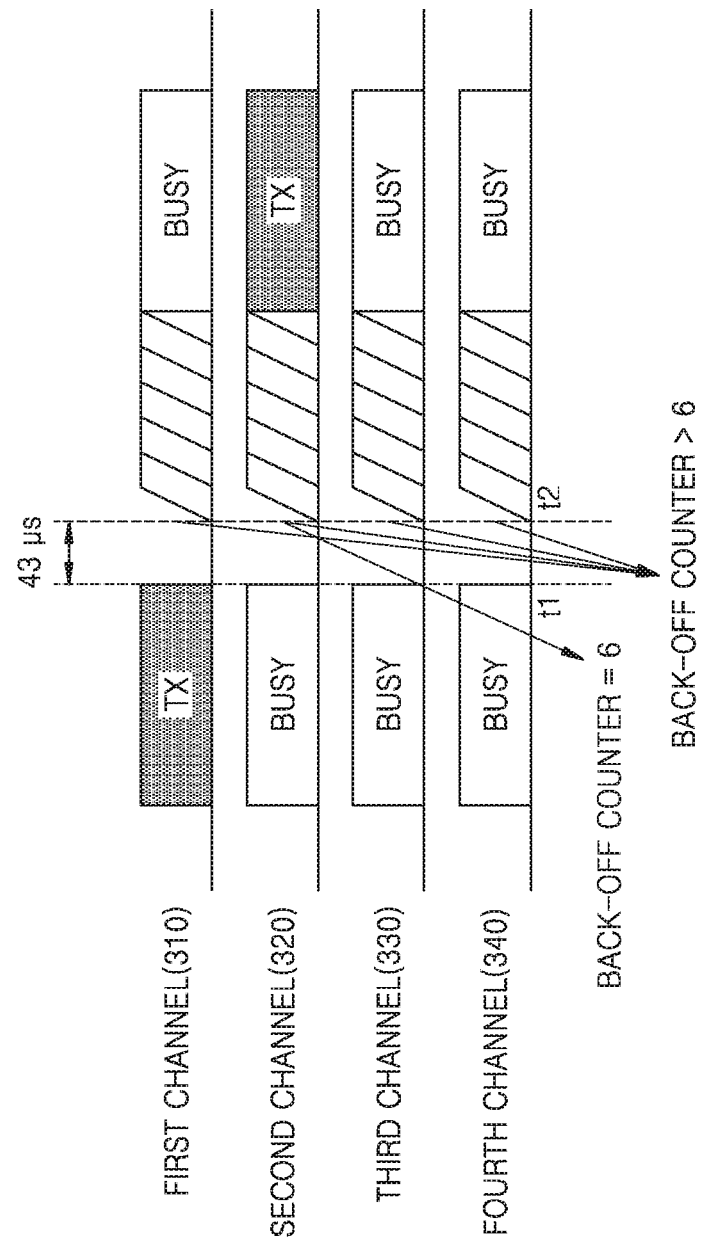
FIG. 3 illustrates a diagram for explaining a listen before talk (LBT) operation, according to an embodiment of the disclosure.

FIG. 3 illustrates a diagram for explaining an LBT operation, according to an embodiment of the disclosure.

Unlicensed band wireless communication technologies use a carrier sense multiple access with collision avoidance (CSMA/CA) scheme to share a frequency resource, in which case one of the collision avoidance methods is the back-off operation.

In the LTE-LAA or Wi-Fi technology that operates in the unlicensed band, when a BS or UE starts transmitting first data or finds a channel state busy, the BS or UE may check the channel state for a certain period of time (e.g., in an arbitration inter-frame space (AIFS)) and perform the back-off operation when the channel is idle. The certain period of time as herein used may be the AIFS or a distributed inter-frame space (DIFS), depending on the BS. The AIFS may be about 43 μs, and the DIFS may be about 34 μs. The certain period of time, of course, may not be limited thereto, but may be changed by settings of the wireless communication system.

The back-off operation is performed to avoid collisions that occur when the devices using the unlicensed band simultaneously attempt transmission as soon as the channel is turned into an unused state. The BS or UE sets a back-off counter by selecting a random number, and has its own delay as much as a number of slots corresponding to the random number.

To perform the back-off operation, the BS or UE determines whether the channel is in use in each slot time, decrements the back-off counter by 1 when determining that the channel is not in use, and performs transmission when the back-off counter is '0'. Consequently, the BS attempts transmission after determining that the channel is not in use for as many slots as the set random number.

Referring to FIG. 3, a first channel 310, a second channel 320, a third channel 330, and a fourth channel 340 may each have an independent back-off counter.

The BS may transmit data by occupying the first channel 310. After completion of data transmission in the first channel 310 at point t1, the BS may perform a separate LBT operation for each of the first to fourth channels 310, 320, 330, and 340 at point t2. A section between points t1 and t2 may be the AIFS.

In an embodiment of the disclosure of the disclosure, a back-off counter for the second channel 310 may be set to '6', and a back-off counter for each of the first, third, and fourth channels 310, 330, and 340 may be set to a number greater than '6'. The back-off counter for the second channel 320 is smaller than the back-off counter of each of the first, third, and fourth channels 310, 330, and 340, so the back-off counter for the second channel 320 may reach '0' first. The BS may transmit data by occupying the second channel 320 whose back-off counter reaches '0' first.

FIG. 4 illustrates subframe structures used in LTE-LAA, according to an embodiment of the disclosure.

Basically, in LTE-LAA, data may be sent in the unit of a full subframe 401. However, the full subframe 401 is about 1.0 ms long, and there may be large overheads due to possible losses for a data transmission time shorter than 1.0 ms. To reduce the overheads, a partial subframe is defined in LTE-LAA.

As the partial subframe, there may be the ending partial subframe and a punctured partial subframe. The ending partial subframe may include one of 3, 6, 9, 10, 11, and 12 symbols. Hence, the ending partial subframe may have a preset length. On the contrary, the punctured partial subframe may include a variable number of symbols, so the length of the punctured partial subframe may be dynamically adjusted.

The full subframe 401 in LAA downlink may include a physical downlink control channel (PDCCH) and a physical downlink shared channel. The full subframe 401 in LAA downlink may include 14 symbols. The PDCCH of the full subframe 401 in LAA downlink may include 1 to 3 symbols, and PDSCH of the full subframe 401 in LAA downlink may include 11 to 13 symbols. It is, of course, not limited thereto.

An ending partial subframe 403 in LAA downlink may include a PDCCH and a PDSCH. Sometimes, however, the ending partial subframe 403 in LAA downlink may not include the PDCCH.

When the ending partial subframe 403 in LAA downlink includes the PDCCH, the total number of symbols in the ending partial subframe 403 in LAA downlink may be the sum of the number of symbols of the PDCCH and the number of symbols of the PDSCH.

The PDCCH of the ending partial subframe 403 in LAA downlink may include 1 to 3 symbols. The PDSCH of the ending partial subframe 403 in LAA downlink may have variable length depending on the type of the ending partial subframe. For example, when the number of symbols in the ending partial subframe 403 in LAA downlink is 12 and the PDCCH includes 1 symbol, the PDSCH may include 11 symbols.

In the following description, a subframe refers to a full subframe. Both a short subframe and a partial subframe refer to a subframe, which is not the full subframe.

FIG. 5 illustrates a configuration of a signal used in a Wi-Fi system, according to an embodiment of the disclosure.

There are a legacy short training field (L-STF), a legacy long training field (L-LTF), and a legacy signal (L-SIG) used in a Wi-Fi system. The L-STF, L-LTF, and L-SIG may be collectively called a legacy preamble. The L-SIG may include information about a legacy rate and legacy length.

In the Wi-Fi system, an L-SIG protection operation may be used to prevent interference with signals. The L-SIG protection operation refers to an operation to predict time at which transmission of a current frame is completed based on the information about the legacy rate and legacy length. This may allow Wi-Fi UEs that perform the L-SIG protection operation to prevent themselves from starting their transmission until transmission of a frame being currently sent by other UE is completed.

The total transmission length of the L-STF, L-LTF, and L-SIG may be about 20 µs. The length of a section from a point at which transmission of a payload is started to a point at which transmission of an ACK is completed may be obtained by dividing the legacy length by the legacy rate. Because the L-SIG includes the information about the legacy rate and the legacy length, the length of the section of a signal sent in the Wi-Fi system may be known from the L-SIG. As will be described later, in an embodiment of the disclosure, the BS may use the L-SIG to predict an end point of a busy section of a channel. The total transmission length of the L-STF, L-LTF, and L-SIG may, of course, be changed by system settings.

Figure 6:
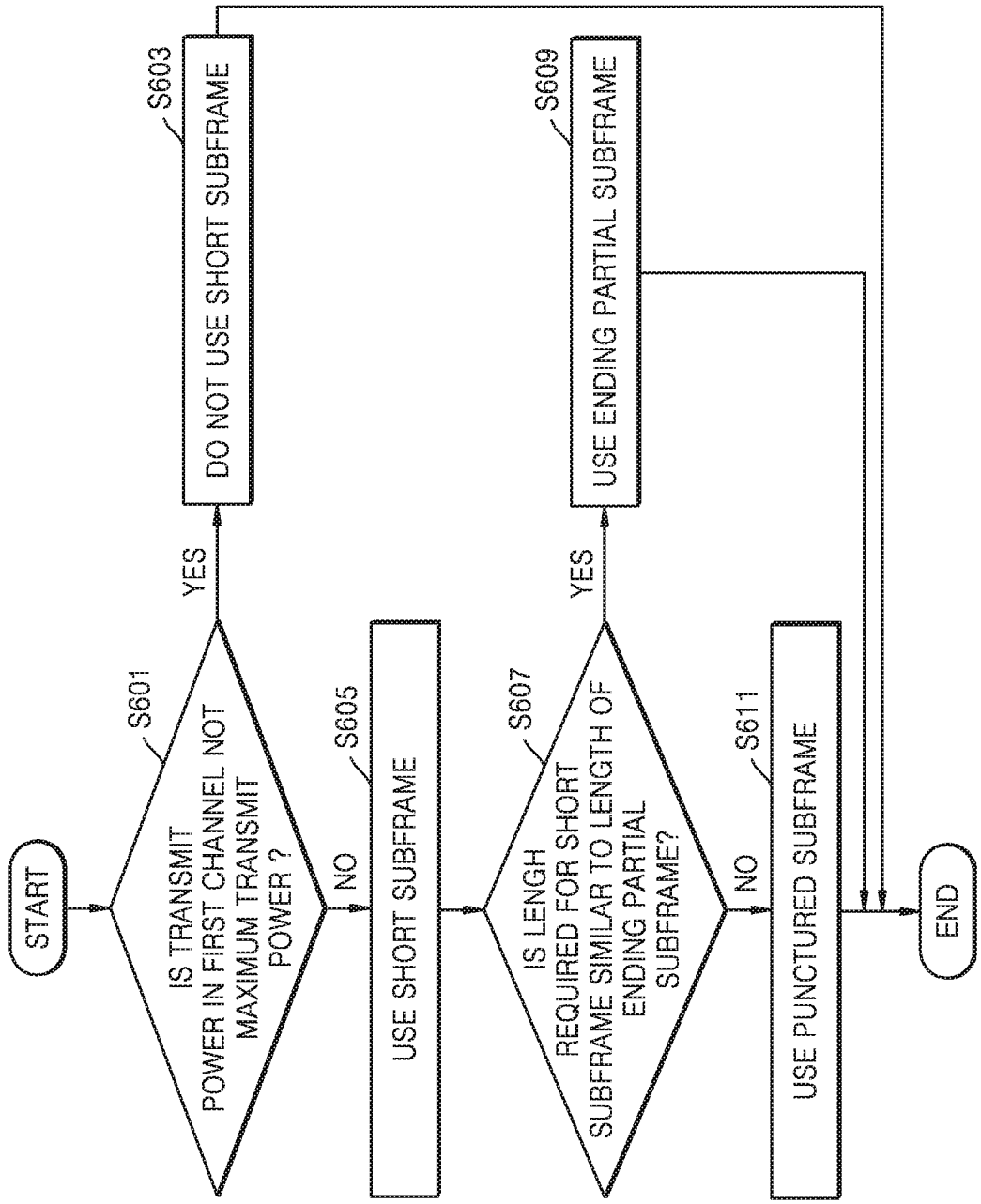
FIG. 6 illustrates a flowchart of a process of deciding whether to use a short subframe based on transmit power of a base station, according to an embodiment of the disclosure.

FIG. 6 illustrates a flowchart of a process in which a BS decides whether to use a short subframe based on transmit power of the BS, according to an embodiment of the disclosure.

In operation S601, a BS compares first transmit power for a first channel with a maximum transmit power of the BS. When the first transmit power is smaller than the maximum transmit power of the BS, the BS may not use a short subframe in operation S603. When the first transmit power is equal to the maximum transmit power of the BS, the BS may use a short subframe in operation S605.

In operation S603, the BS may not use the short subframe. Specifically, the BS may determine a subframe equal in length to the first subframe to be the second subframe.

In operation S605, the BS may use a short subframe. Specifically, the BS may determine a subframe shorter than the first subframe to be the second subframe. The BS may detect an earlier point among the first point at which transmission of the first subframe in the first channel is completed and a second point at which a busy state of the second channel is terminated. In determining a type of the second subframe, when the second point is earlier than the first point, the BS may calculate an end point of a back-off operation for the second channel to determine a type of the second subframe. When the first point is earlier than the second point, the BS may predict a point at which the busy state of the second channel is terminated. Furthermore, the BS may calculate the end point of the back-off operation for the second channel, and based on the predicted point and the calculated point, determine a type of the second subframe.

In operation S607, the BS may compare length required for the short subframe with the length of an ending partial subframe. Specifically, the BS may select from among preset ending partial subframes an ending partial subframe having a length corresponding to the type of the second subframe determined in operation S605.

When there is an ending partial subframe having the length corresponding to the type of the second subframe determined in the operation S605 among the preset ending partial subframes, the BS may use the ending partial subframe in operation S609.

When there is no ending partial subframe having the length corresponding to the type of the second subframe determined in the operation S605 among the preset ending partial subframes, the BS may use a punctured partial subframe in operation S611.

Figure 7:
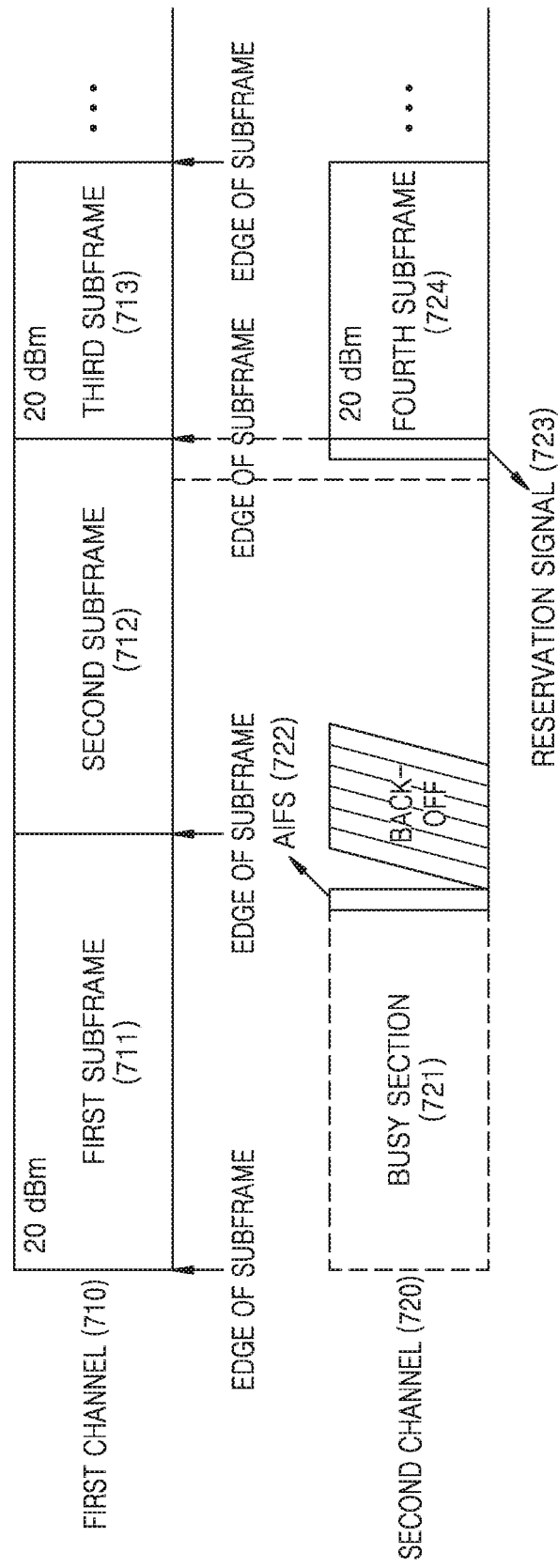
FIG. 7 illustrates a diagram of a process of occupying a second channel based on transmit power of a base station, according to an embodiment of the disclosure.

FIG. 7 illustrates a diagram of a process in which a BS occupies a second channel when transmit power for a first channel is smaller than a maximum transmit power of the BS, according to an embodiment of the disclosure.

In the embodiment of the disclosure, the BS may occupy a first channel 710 and transmit data in a first subframe 711.

When attempting to occupy a second channel 720, the BS may determine whether first transmit power for the first channel is smaller than the maximum transmit power of the BS. For example, when the maximum transmit power of the BS is 23 dBm and the first transmit power is 20 dBm, the BS may determine that the first transmit power is smaller than the maximum transmit power of the BS.

Because the first transmit power is smaller than the maximum transmit power of the BS, the BS may schedule a second subframe 712 having the same length as that of the first subframe 711.

The BS may check a state of the second channel 720 for an AIFS 722 after a busy section 721 of the second channel 720, and may perform a back-off operation when the second channel 720 is in an idle state. The BS may check whether a back-off counter for the second channel 720 is '0'. After the back-off counter reaches '0', the BS may check again whether the second channel 720 is in an idle state. Before transmitting a reservation signal 723, the BS may check again whether the second channel is idle.

The BS may transmit the second subframe 712 at an edge of the first subframe 711 after transmitting the first subframe 711 in the first channel 710. The second subframe 712 may be equal in length to the first subframe 711.

The BS may transmit a third subframe 713 at an edge of the second subframe 712 after transmitting the second subframe 712 in the first channel 710. The BS may transmit the third subframe 713 right away without the need to schedule a reservation signal to transmit the third subframe 713.

The BS may schedule a reservation signal 723 to transmit a fourth subframe 724 in the second channel 720. The BS may reserve occupancy of the second channel 720 by transmitting the reservation signal 723. When the occupancy of the second channel 720 is successful, the BS may transmit the fourth subframe 724 in the second channel 720.

Figure 8:
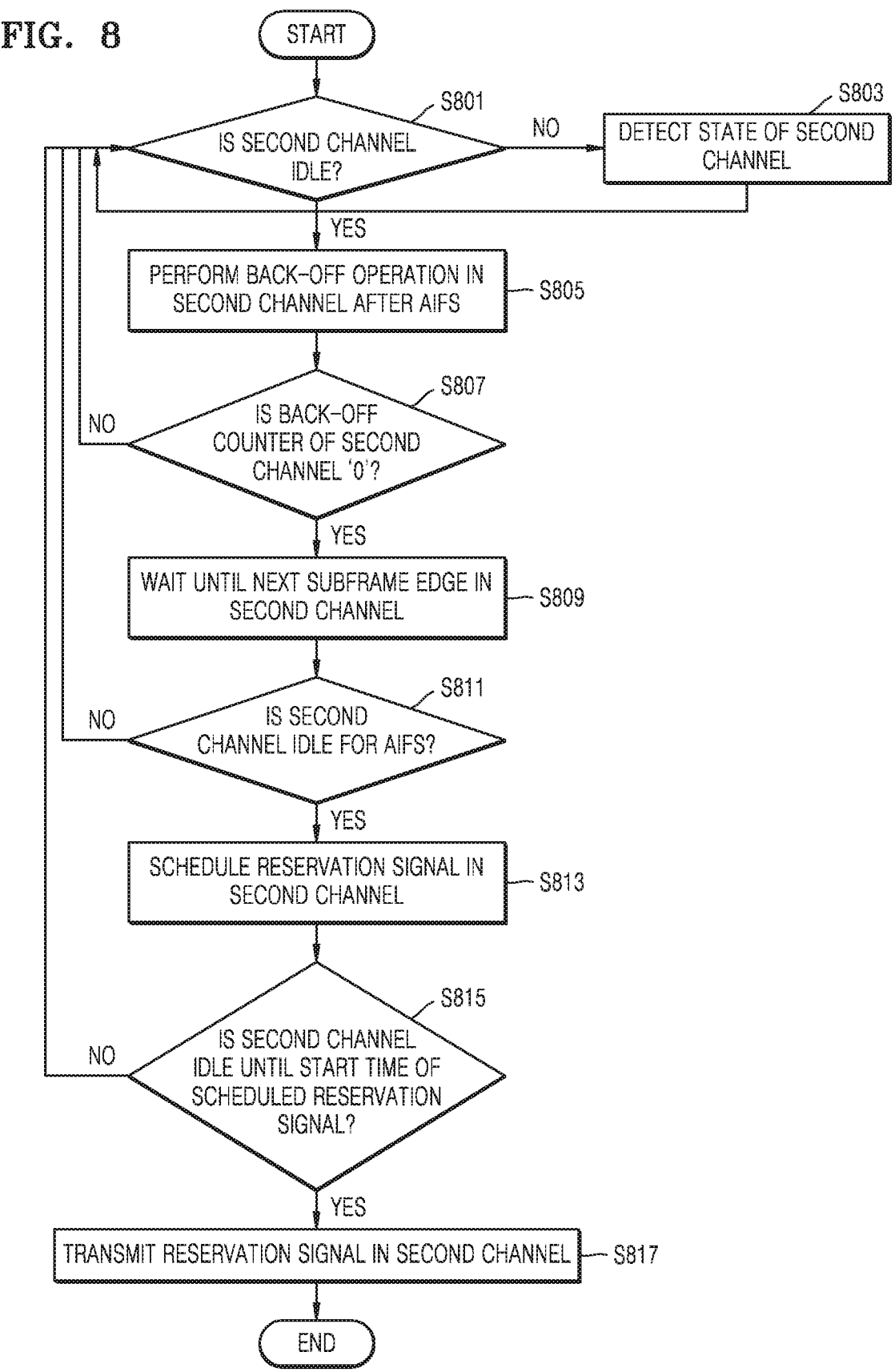
FIG. 8 illustrates a flowchart of a process of occupying a second channel based on transmit power of a base station, according to another embodiment of the disclosure.

FIG. 8 illustrates a flowchart of a process to occupy a second channel when transmit power for a first channel is smaller than a maximum transmit power of a BS, according to an embodiment of the disclosure.

In operation S801, the BS may determine whether the second channel is in an idle state. When the second channel is not in the idle state, the BS may detect a state of the second channel at certain intervals to determine whether the second channel is in the idle state, in operation S803. When it is determined that the second channel is in the idle state, the BS may perform a back-off operation for the second channel in operation S805. The back-off operation may be performed after a period of an AIFS.

In operation S807, the BS may check whether a back-off counter for the second channel is '0'. When the back-off counter is not '0', the process goes back to the operation S801 in which the BS may determine again whether the second channel is in the idle state.

In operation S809, the BS may wait until the next subframe edge in the second channel.

In operation S811, after the back-off counter reaches '0', the BS may determine again whether the second channel is idle. When the second channel is not in the idle state, the process goes back to the operation S801 in which the BS may determine again whether the second channel is idle.

In operation S813, the BS may schedule a reservation signal to occupy the second channel. Specifically, the BS may schedule the reservation signal 723 to transmit the fourth subframe 724 in the second channel 720.

In operation S815, before transmitting the reservation signal 723, the BS may determine again whether the second channel 720 is idle. When the second channel is not in the idle state, the process goes back to the operation S801 in which the BS may determine again whether the second channel is idle.

In operation S817, the BS may reserve occupancy of the second channel 720 by transmitting the reservation signal 723. When the occupancy of the second channel 720 is successful, the BS may transmit the fourth subframe 724 in the second channel 720.

Figure 9:
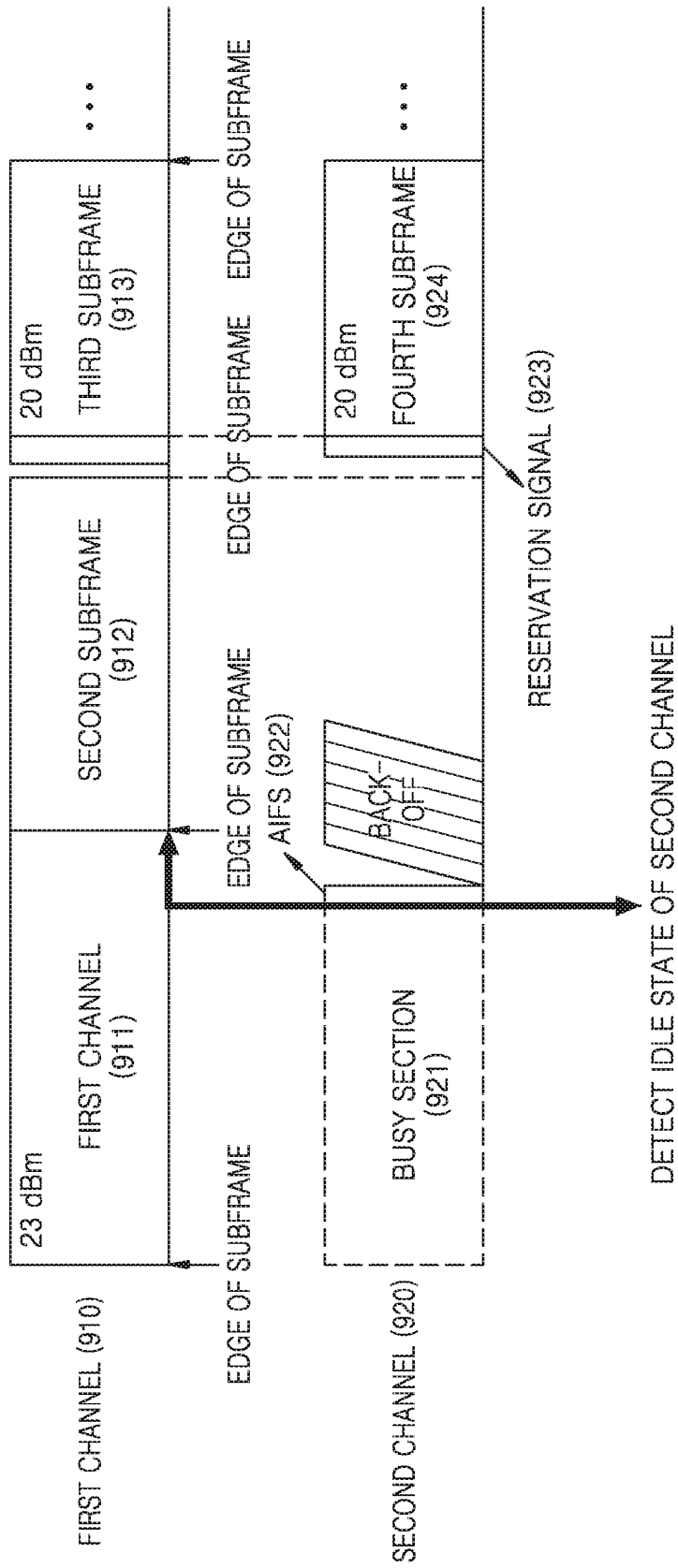
FIG. 9 illustrates a diagram of a process of occupying a second channel based on a starting point of an idle state, according to an embodiment of the disclosure.

FIG. 9 illustrates a diagram of a process in which a BS occupies a second channel when transmit power for a first channel is equal to a maximum transmit power of the BS and a second point is earlier than a first point, according to an embodiment of the disclosure.

In the embodiment of the disclosure, the BS may occupy a first channel 910 and transmit data in a first subframe 911.

When attempting to occupy a second channel 920, the BS may determine whether first transmit power for the first channel 910 is smaller than the maximum transmit power of the BS. For example, when the maximum transmit power of the BS is 23 dBm and the first transmit power is also 23 dBm, the BS may determine that the first transmit power is equal to the maximum transmit power of the BS.

Because the first transmit power is equal to the maximum transmit power of the BS, the BS may schedule a second subframe 912 that is shorter than the first subframe 911. When the type of the wireless communication system is LTE-LAA, the BS may determine the second subframe 912 with an ending partial subframe or a punctured partial subframe. When the type of the wireless communication system is Wi-Fi, the BS may determine the length of the second subframe 912 based on the L-SIG signal.

The BS may check a state of the second channel 920 for an AIFS 922 after a busy section 921 of the second channel 920, and may perform a back-off operation when the second channel 920 is in an idle state. The BS may check whether a back-off counter for the second channel 920 is '0'. After the back-off counter reaches '0', the BS may check again whether the second channel 920 is in an idle state. Before transmitting a reservation signal 923, the BS may determine again whether the second channel is idle.

The BS may transmit the second subframe 912 at an edge of the first subframe 911 after transmitting the first subframe 911 in the first channel 910. The second subframe 912 may be shorter than the first subframe 911.

The BS may schedule a reservation signal to transmit a third subframe 913 after transmitting the second subframe 912 in the first channel 910. Before transmitting the reservation signal in the first channel 910, i.e., in between a point at which transmission of the second subframe 912 is completed and a point at which transmission of the reservation signal in the first channel 910 is started, the BS may stop data transmission in the first channel 910. This is to set the transmit power for the first channel 910 to be smaller than the maximum transmit power. Hence, the BS may transmit data in the first channel 910 and the second channel 920 at a smaller transmit power than the maximum transmit power.

The BS may schedule a reservation signal 923 to transmit a fourth subframe 924 in the second channel 920. The BS may reserve occupancy of the second channel 920 by transmitting the reservation signal 923. When the occupancy of the second channel 920 is successful, the BS may transmit the fourth subframe 924 in the second channel 920.

Figure 10:
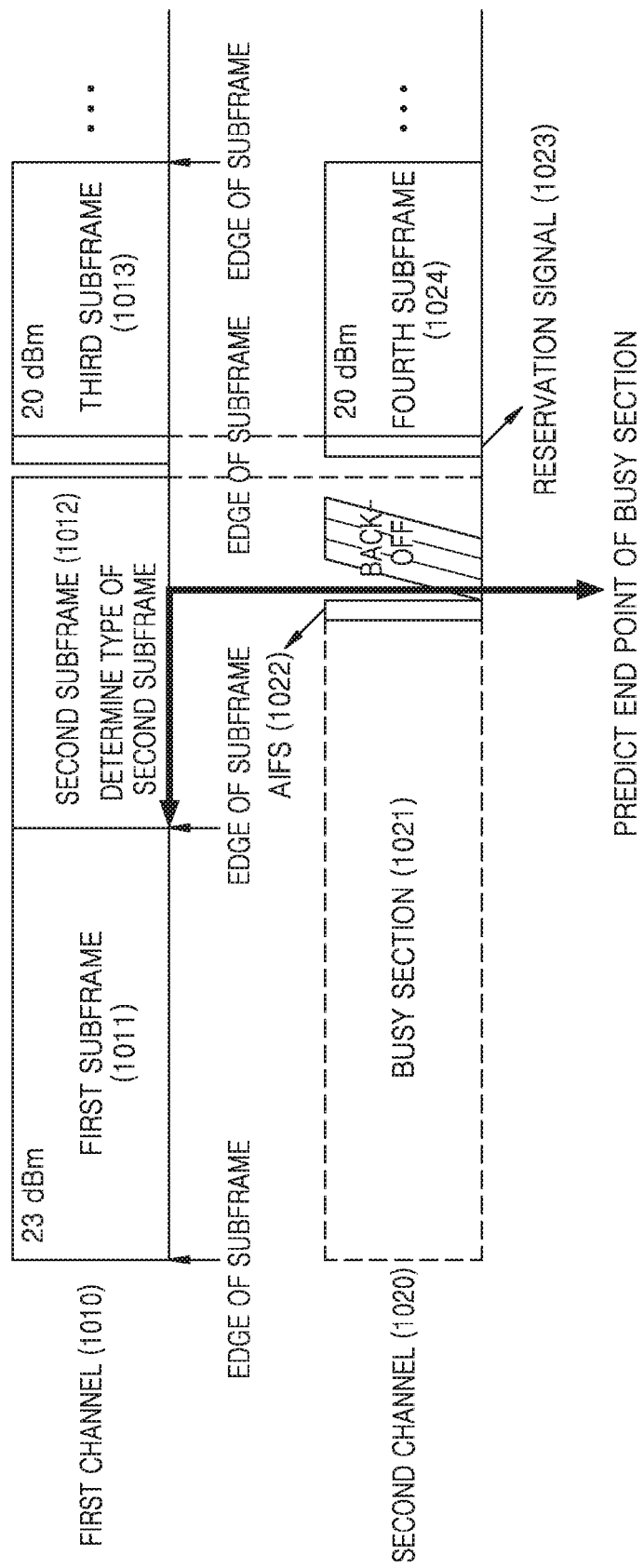
FIG. 10 illustrates a diagram of a process of occupying a second channel based on a starting point of an idle state, according to another embodiment of the disclosure.

FIG. 10 illustrates a diagram of a process in which a BS occupies a second channel when transmit power for a first channel is equal to a maximum transmit power of the BS and a first point is earlier than a second point, according to an embodiment of the disclosure.

In the embodiment of the disclosure, a BS may occupy a first channel 1010 and transmit data in a first subframe 1011.

When attempting to occupy a second channel 1020, the BS may determine whether first transmit power for the first channel 1010 is smaller than a maximum transmit power of the BS. For example, when the maximum transmit power of the BS is 23 dBm and the first transmit power is also 23 dBm, the BS may determine that the first transmit power is equal to the maximum transmit power of the BS.

Because the first transmit power is equal to the maximum transmit power of the BS, the BS may schedule a second subframe 1012 that is shorter than the first subframe 1011. When the type of the wireless communication system is LTE-LAA, the BS may determine the second subframe 1012 with an ending partial subframe or a punctured partial subframe. When the type of the wireless communication system is Wi-Fi, the BS may determine the length of the second subframe 1012 based on the L-SIG signal.

At a first point, when a busy section 1021 of the second channel 1020 still continues, the BS may predict a point at which the busy section 1021 of the second channel 1020 is terminated. When the type of the wireless communication system is LTE-LAA, the BS may predict a point at which the busy state of the second channel 1020 is terminated based on a maximum channel occupancy time (MCOT) or transmission length information of the second channel 1020.

The MCOT may refer to a maximum time length that may continuously occupy a channel without an extra LBT operation. In LTE-LAA, the MCOT may be about 8 ms. The MCOT, of course, may vary by settings or policies of the wireless communication network. For example, in Japan, the MCOT may be up to 4 ms in the 5 GHz unlicensed band.

The transmission length information may refer to information indicating transmission length of an LTE-LAA BS, which is sent along with data when the LTE-LAA BS transmits the data. The transmission length information may be sent in at least one of a primary synchronization signal (PSS), a secondary synchronization signal (SSS), or a discovery reference signal (DRS).

When the type of the wireless communication system is Wi-Fi, the BS may use the L-SIG to predict a point at which the busy state of the second channel 1020 is terminated. As described above in connection with FIG. 5, the BS may predict an end point of a busy section of the channel based on information about the legacy rate and legacy length included in the L-SIG.

The BS may check a state of the second channel 1020 for an AIFS 1022 after a busy section 1021 of the second channel 1020, and may perform a back-off operation when the second channel 920 is in an idle state. The BS may calculate a point at which the back-off operation of the second channel 1020 is completed. The BS may check whether a back-off counter for the second channel 1020 is '0'. After the back-off counter reaches '0', the BS may check again whether the second channel 1020 is in an idle state. Before transmitting a reservation signal 1023, the BS may determine again whether the second channel is in an idle state.

The BS may determine a type of the second subframe 1012 based on the end point of the busy state of the second channel 1020 and the point at which the back-off operation performed on the second channel 1020 is completed. Specifically, the BS may determine the length of the second subframe 1012 to complete transmission of the second subframe 1012 until after the back-off operation of the second channel 1020 is completed.

The BS may transmit the second subframe 1012 at an edge of the first subframe 1011 after transmitting the first subframe 1011 in the first channel 1010. The second subframe 1012 may be shorter than the first subframe 1011.

The BS may schedule a reservation signal to transmit a third subframe 1013 after transmitting the second subframe 1012 in the first channel 1010.

The BS may schedule the reservation signal 1023 to transmit a fourth subframe 1024 in the second channel 1020. The BS may reserve occupancy of the second channel 1020 by transmitting the reservation signal 1023. When the occupancy of the second channel 1020 is successful, the BS may transmit the fourth subframe 1024 in the second channel 1020.

Figure 11:
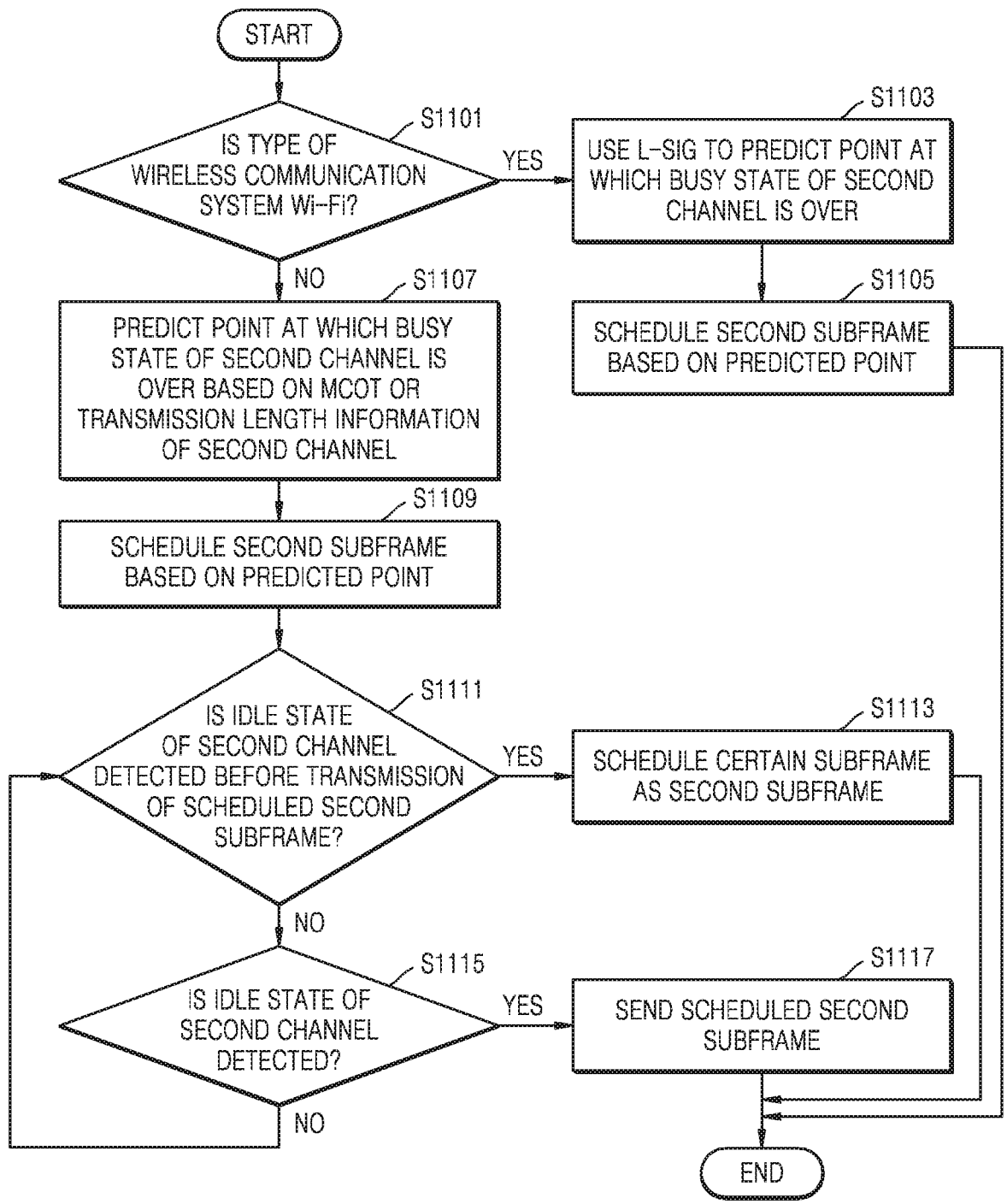
FIG. 11 illustrates a flowchart of how to determine a second subframe based on a type of a wireless communication system, and first and second points of time, according to an embodiment of the disclosure.

FIG. 11 illustrates a flowchart of how to determine a second subframe based on a type of a wireless communication system, and first and second points of time, according to an embodiment of the disclosure.

In operation S1101, the BS may determine whether the type of the wireless communication system is Wi-Fi.

When the type of the wireless communication system is Wi-Fi, the BS may use the L-SIG to predict a point at which a busy state of a second channel is terminated, in operation S1103.

In operation S1105, the BS may schedule a second subframe based on a point predicted using the L-SIG, at which the busy state of the second channel is terminated.

When the type of the wireless communication system is LTE-LAA instead of Wi-Fi, the BS may predict a point at which the busy state of the second channel is terminated based on the MCOT or transmission length information of the second channel, in operation S1107.

In operation S1109, the BS may schedule the second subframe based on the predicted point of time.

In operation S1111, the BS may determine whether an idle state of the second channel is detected before transmission of the scheduled second frame. Specifically, the BS may compare a point at which transmission of the first subframe is completed (a first point) with a point at which an idle state of the second channel is detected (a second point).

When the second point is earlier than the first point, the BS may schedule a certain subframe as the second subframe in operation S1113, as described above with reference to FIG. 9.

When the first point is earlier than the second point, the BS may determine again whether the second channel is in an idle state, in operation S1115. When the second channel is in the idle state, the BS may transmit the scheduled second subframe in operation S1117, as described above with reference to FIG. 10.

When the second channel is not in the idle state, the process goes back to the operation S1111, in which the BS may determine whether the idle state of the second channel is detected before transmission of the scheduled second frame.

Figure 12:
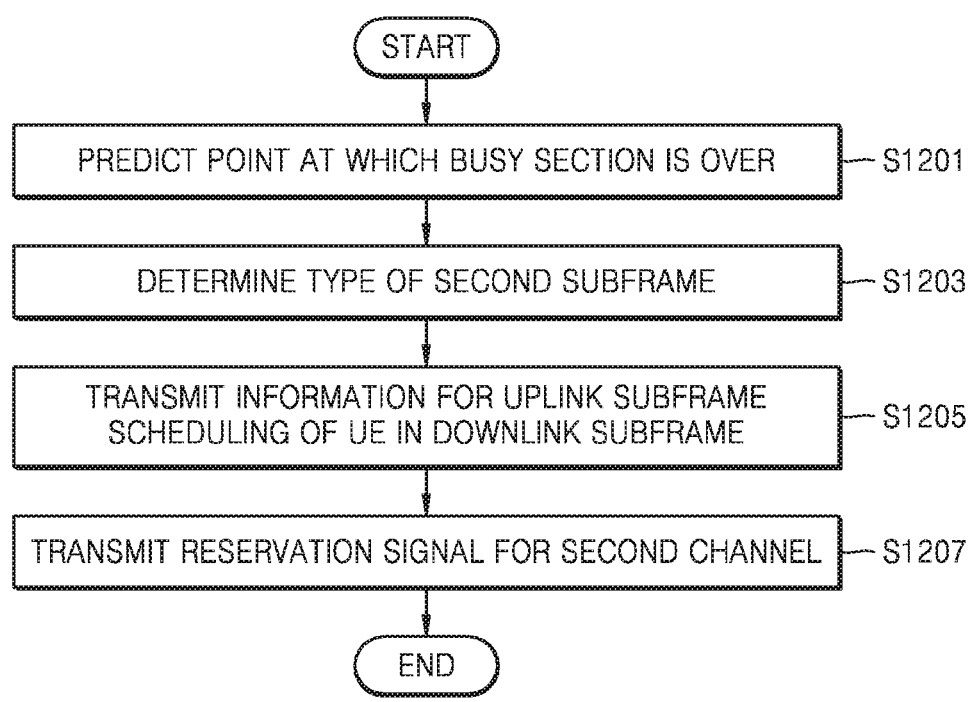
FIG. 12 illustrates a flowchart of an uplink scheduling method for user equipment (UE), according to an embodiment of the disclosure.

FIG. 12 illustrates a flowchart of an uplink scheduling method for UE, according to an embodiment of the disclosure.

In the embodiment of the disclosure, a BS may schedule a second subframe for a UE to occupy an additional channel for uplink transmission.

In operation S1201, the BS may predict a point at which a busy section of the second channel is terminated. The BS may transmit information about whereabouts and length of the second subframe in a PDCCH or PDSCH to the UE.

In an embodiment of the disclosure, the BS may transmit information on a short subframe indicator and information on a short subframe resource block indicator to the UE.

The information on the short subframe indicator may include information about whereabouts and length of the second subframe. The information on the short subframe indicator may include the information about whereabouts and length of the second subframe each in a vector format. The information on the short subframe indicator may be in bits of a certain format. The information on the short subframe resource block indicator may be information about a resource block of the second subframe.

In operation S1203, the BS may determine a type of the second subframe. The BS may determine length of the second subframe based on the point predicted in the operation S1201.

In operation S1205, the BS may transmit information for uplink subframe scheduling of a UE involved in uplink transmission in a downlink subframe.

In operation S1207, the BS may transmit a reservation signal for the second channel. Based on the reservation signal for the second channel, the BS may occupy the second channel.

Figure 13:
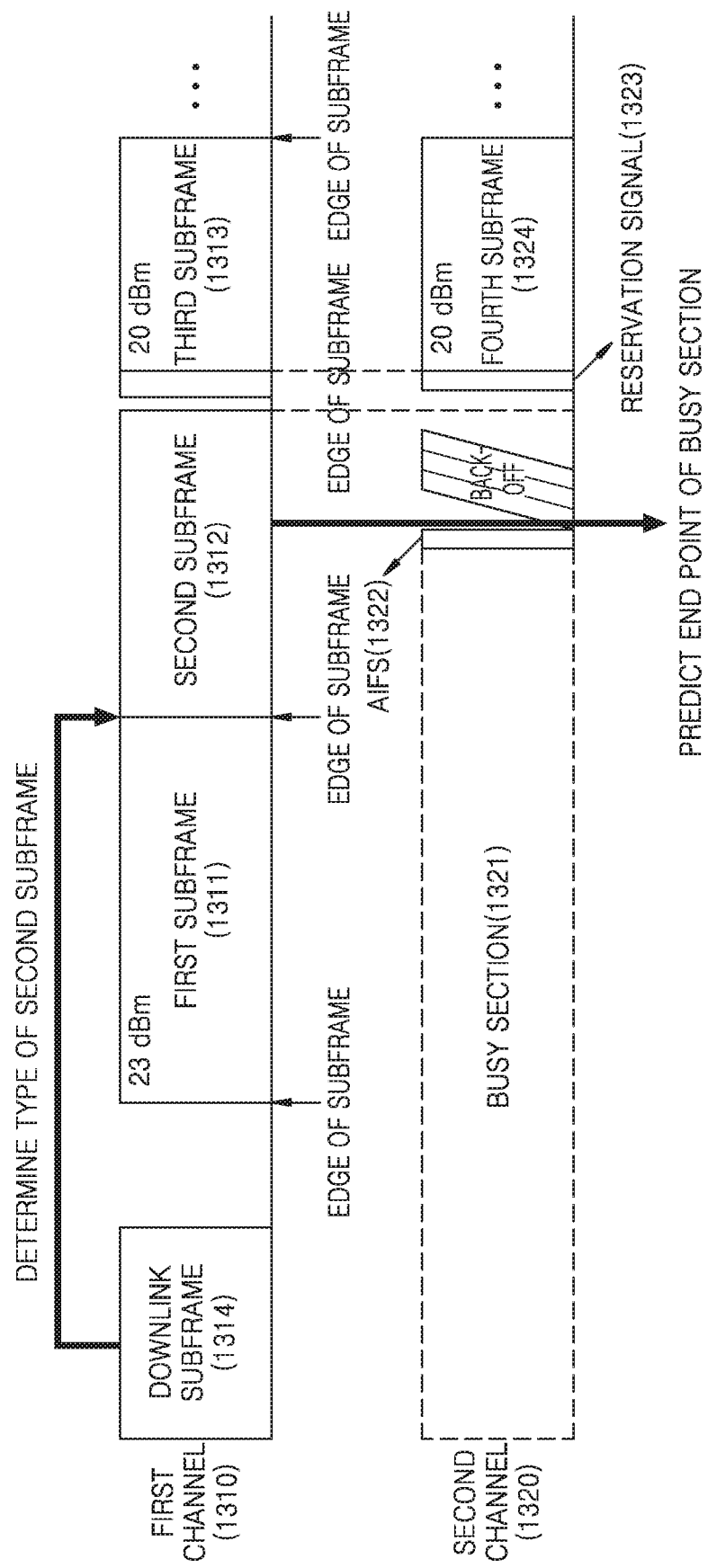
FIG. 13 illustrates a diagram of a process of an uplink scheduling method, according to an embodiment of the disclosure.

FIG. 13 illustrates a diagram of a process of an uplink scheduling method.

In the embodiment of the disclosure, a BS may schedule a second subframe for a UE to occupy an additional channel for uplink transmission.

The BS may predict an end point of a busy section of a second channel 1320. Based on the predicted point, the Bs may schedule the second subframe of the UE for uplink transmission.

The UE involved in uplink transmission may transmit the scheduled second subframe in a first channel 1310 after a first subframe 1311, and hence may occupy the second channel 1320.

The BS may transmit information about whereabouts and length of a second subframe 1312 in a PDCCH or PDSCH to the UE.

In an embodiment of the disclosure, the BS may transmit information on a short subframe indicator and information on a short subframe resource block indicator to the UE.

The information on the short subframe indicator may include information about whereabouts and length of the second subframe 1312. The information on the short subframe indicator may include the information about whereabouts and length of the second subframe 1312 each in a vector format. The information on the short subframe indicator may be in bits of a certain format. The information on the short subframe resource block indicator may be information about a resource block of the second subframe 1312.

The BS may check a state of the second channel 1320 for an AIFS 1322 after a busy section 1321 of the second channel 1320, and may perform a back-off operation when the second channel 1320 is in an idle state. The BS may calculate a point at which the back-off operation of the second channel 1320 is completed. The BS may check whether a back-off counter for the second channel 1320 is '0'. After the back-off counter reaches '0', the BS may check again whether the second channel 1320 is in an idle state. Before transmitting a reservation signal 1323, the BS may check again whether the second channel is in an idle state.

The BS may schedule a reservation signal to transmit a third subframe 1313 after transmitting the second subframe 1312 in the first channel 1310.

The BS may schedule a reservation signal 1323 to occupy the second channel 1320. The BS may reserve occupancy of the second channel 1320 by transmitting the reservation signal 1323. When the occupancy of the second channel 1320 is successful, the BS may transmit the fourth subframe 1324 in the second channel 1320.

Figure 14:
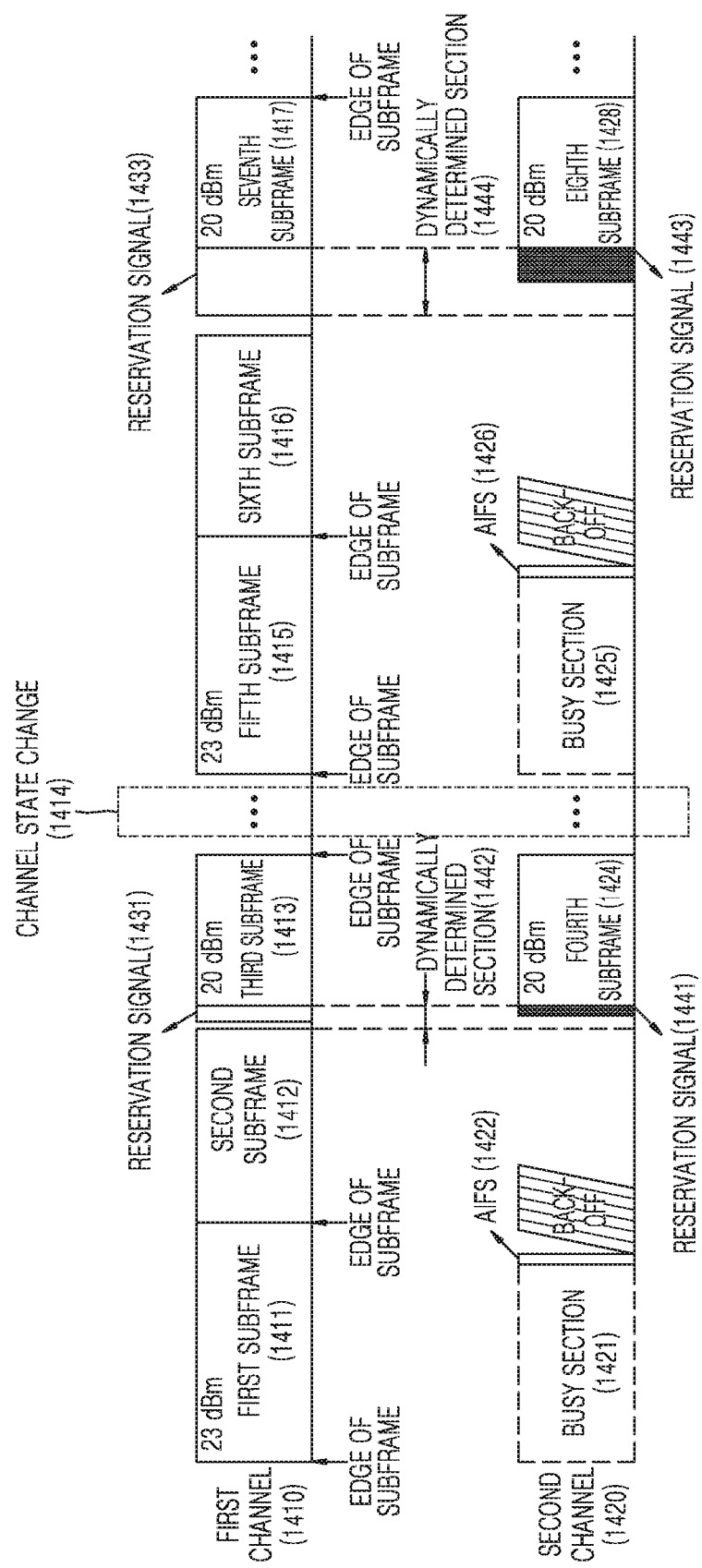
FIG. 14 illustrates a diagram of a process of adjusting the length of a reservation signal, according to an embodiment of the disclosure.

FIG. 14 illustrates a diagram of a process in which a BS adjusts length of a reservation signal, according to an embodiment of the disclosure.

In the embodiment of the disclosure, when there is a channel state change 1414, the BS may use a reservation signal 1413 that is longer than a reservation signal 1413 used before the channel state change occurs, so as to increase a chance of occupying a second channel 1420.

What are described in connection with FIG. 9 may be equally applied to operation of the BS before the channel state change 1414 occurs.

With the operation as described above in connection with FIG. 9, the BS may occupy both the first channel 1410 and the second channel 1420, and then may lose occupancy of the second channel 1420 due to occurrence of the channel state change 1414. As an example of the channel state change 1414, there may be an increase in the number of LTE-AA or Wi-Fi BSs existing in the channel. An occasion when the BS fails to occupy the second channel 1420 may include either an occasion when the number of collisions on the second channel 1420 is more than a certain value or an occasion when a collision ratio for the second channel 1420 is more than a certain value, or both.

In the embodiment of the disclosure, the BS may schedule a reservation signal 1443 that is longer than a reservation signal 1441 to occupy the second channel 1420. The length of the reservation signal 1443 for transmission of an eighth subframe 1428 may be dynamically determined. The reservation signal 1443 may be set in a section 1444, which may be dynamically determined by the BS and in which the reservation signal 1443 may be dynamically determined accordingly.

To schedule the reservation signal 1443 that is longer than the reservation signal 1441, the BS may schedule a sixth subframe 1416 that is shorter than the second subframe 1412. For example, when the second subframe 1412 includes 6 symbols, the sixth subframe 1416 may include 4 symbols.

The BS may transmit the sixth subframe 1416 at an edge of a fifth subframe 1415 after transmitting the fifth subframe 1415 in the first channel 1410. The sixth subframe 1416 may be shorter than the fifth subframe 1415.

The BS may schedule a reservation signal 1433 to transmit a seventh subframe 1417 in the first channel 1410. Before transmitting the reservation signal 1433 in the first channel 1410, i.e., in between a point at which transmission of the fifth subframe 1415 is completed and a point at which transmission of the reservation signal 1433 is started, the BS may stop data transmission in the first channel 1410. This is to set the transmit power for the first channel 1410 to be smaller than the maximum transmit power. Accordingly, the BS may occupy the first and second channels 1410 and 1420 and transmit data at transmit power smaller than the maximum transmit power.

The BS may schedule the reservation signal 1443 to transmit the eighth subframe 1428 in the second channel 1420. The BS may reserve occupancy of the second channel 1420 by transmitting the reservation signal 1443. When the occupancy of the second channel 1420 is successful, the BS may transmit the eighth subframe 1428 in the second channel 1420. The length of the reservation signal 1443 for transmission of the eighth subframe 1428 may be dynamically determined. The reservation signal 1441 may be set in a section 1444, which may be dynamically determined by the BS and in which the reservation signal 1443 may be dynamically determined accordingly.

Figure 15A:
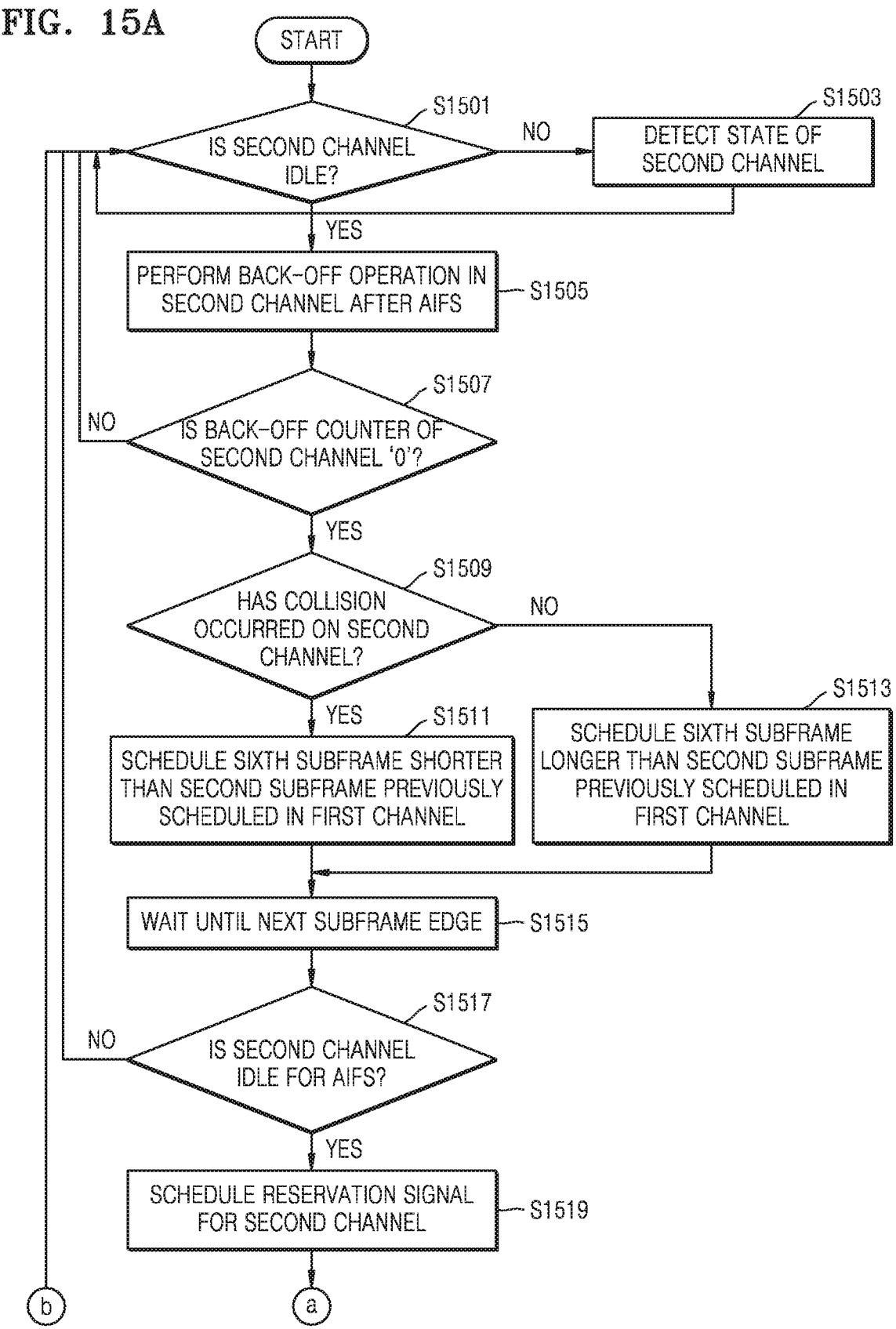
FIG. 15A illustrates a flowchart of a process of adjusting the length of a reservation signal, according to an embodiment of the disclosure.
Figure 15B:
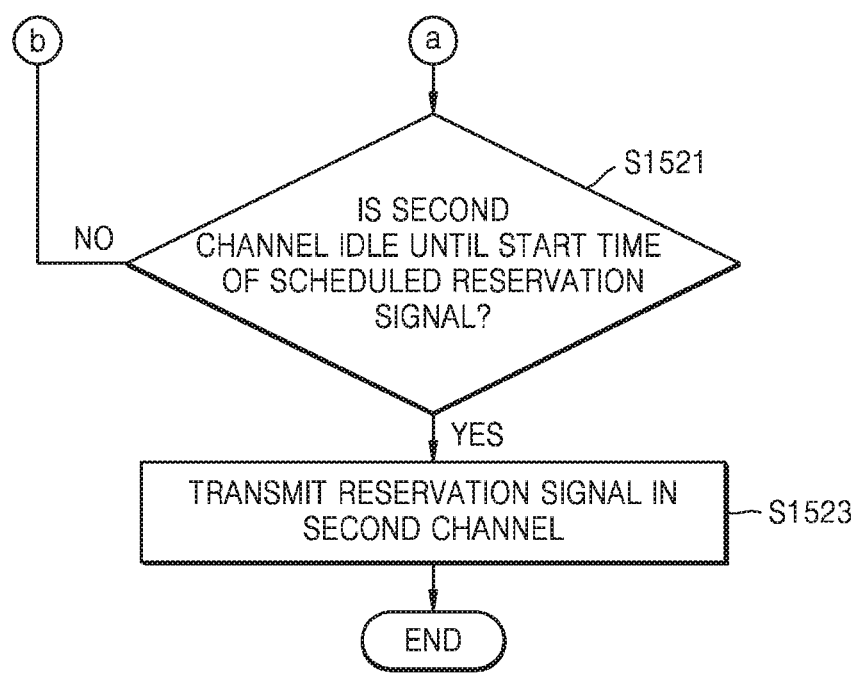
FIG. 15B illustrates a flowchart of a process of adjusting the length of a reservation signal, according to an embodiment of the disclosure.

FIGS. 15A and 15B illustrate flowcharts of a process of adjusting length of a reservation signal, according to an embodiment of the disclosure.

In operation S1501, the BS may determine whether a second channel is in an idle state. When the second channel is not in the idle state, the BS may continue to determine whether the second channel is in the idle state by detecting a state of the second channel in operation S1503. When it is determined that the second channel is in the idle state, the BS may perform a back-off operation on the second channel in operation S1505. The back-off operation may be performed after a period of an AIFS.

In operation S1507, the BS may check whether a back-off counter for the second channel is '0'. When the back-off counter is not '0', the process goes back to the operation S1501 in which the BS may determine again whether the second channel is in the idle state.

In operation S1509, the BS may determine whether there has been a collision in the second channel. Determining whether there has been a collision may include either determining whether the number of collisions on the second channel is higher than a certain value or determining whether a collision ratio for the second channel is higher than a certain value, or both.

When there has been a collision in the second channel, the BS may schedule a sixth subframe shorter than a second subframe that has previously been scheduled in a first channel, in operation S1511. Simultaneously, the BS may schedule a reservation signal longer than a reservation signal that has previously been scheduled in the second channel.

When there has not been a collision in the second channel, the BS may schedule a sixth subframe longer than the second subframe that has previously been scheduled in the first channel, in operation S1513. Simultaneously, the BS may schedule a reservation signal equal to or shorter than a reservation signal that has previously been scheduled in the second channel.

In operation S1515, the BS may wait until the next subframe edge in the second channel. The next subframe edge in the second channel may refer to a point at which a busy section of the second channel begins. The point at which the busy section of the second channel begins may be the same point as the starting point of the fifth subframe.

In operation S1517, the BS may determine whether the second channel is in an idle state for an AIFS.

In operation S1519, the BS may schedule a reservation signal for an eighth subframe in the second channel.

In operation S1521, the BS may determine whether the second channel is in an idle state until a point to start transmission of the reservation signal scheduled for the eighth subframe.

In operation S1523, the BS may transmit the reservation signal for the eighth subframe in the second channel.

Figure 16:
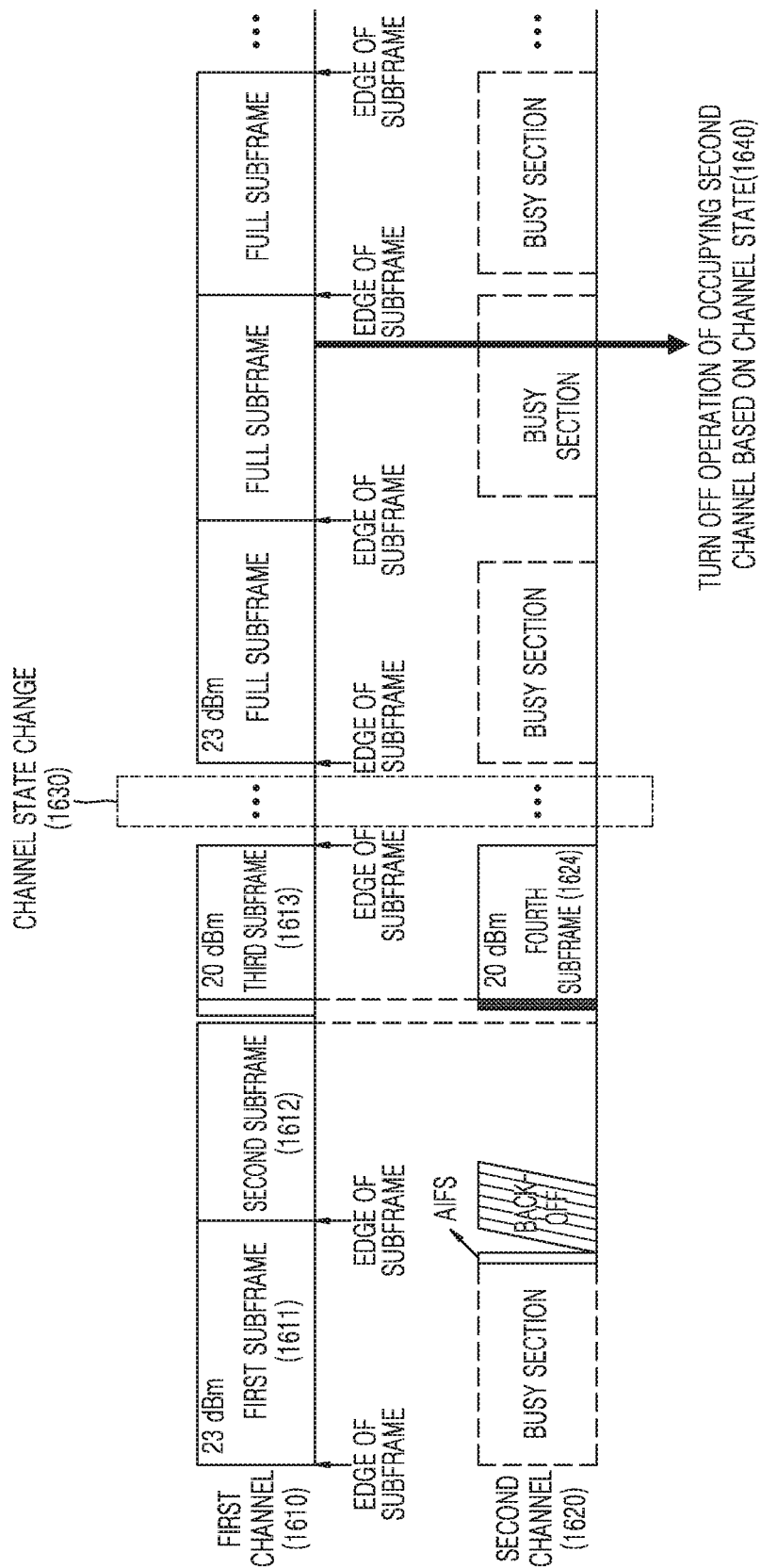
FIG. 16 illustrates a diagram of a process of turning off operation of occupying an additional channel based on a channel condition, according to an embodiment of the disclosure.

FIG. 16 illustrates a diagram of a process of turning off operation of occupying an additional channel based on a channel condition, according to an embodiment of the disclosure.

In the embodiment of the disclosure, based on a channel state change 1630, the BS may not occupy a second channel 1620. The BS may turn off (1640) operation of occupying the second channel 1620 based on a channel condition. Turning off the operation of occupying the second channel 1620 may mean stopping an attempt to occupy the second channel 1620.

In an embodiment of the disclosure, for a period after the channel state change 1630, the BS may occupy the first channel 1610.

The operation in which the BS turns off operation to occupy the second channel 1620 may be triggered e.g., when overhead resulting from the attempt to occupy the second channel is higher than a certain value.

The turning off operation may be performed by the user or automatically when a preset condition is met. The preset condition may include an occasion when the overhead resulting from the attempt to occupy the second channel is higher than the certain value.

Figure 17:
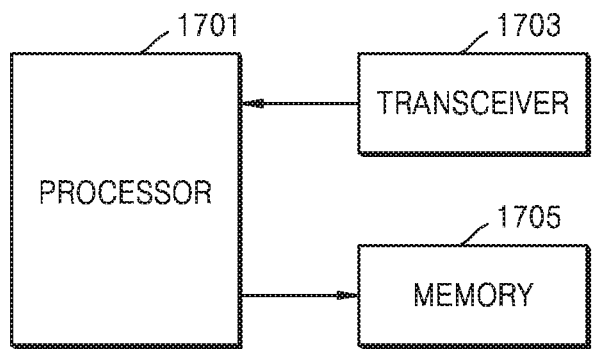
FIG. 17 illustrates a block diagram of a base station, according to an embodiment of the disclosure.

FIG. 17 illustrates a block diagram of a BS, according to an embodiment of the disclosure.

Referring to FIG. 17, a BS may include a processor 1701, a transceiver 1703, and a memory 1705.

In the embodiment of the disclosure, the processor 1701 may be defined to be a circuit, an ASIC, or at least one processor. The processor 1701 may control general operation of the BS according to embodiments of the disclosure.

The processor 1701 may determine a second subframe based on a type of a wireless communication system, first and second points of time.

The processor 1701 may detect an earlier point among a first point at which transmission of a first subframe in a first channel is completed and a second point at which a busy state of a second channel is terminated. The processor 1701 may determine a type of the second subframe based on at least one of the detection result or first transmit power for the first channel. Furthermore, the processor 1701 may transmit the second subframe of the determined type in the first channel after transmission of the first subframe is completed. After transmission of the second subframe is completed, the processor 1701 may transmit a third subframe in the first channel and a fourth subframe in the second channel.

The processor 1701 may determine second transmit power based on the first transmit power for the first channel. Transmitting the third and fourth subframes may include transmitting the third and fourth subframes at the second transmit power.

According to an embodiment of the disclosure, determining by the processor 1701 the type of the second subframe may include determining a subframe shorter than the first subframe to be the second subframe when the first transmit power is equal to the maximum transmit power of the BS, and determining by the processor 1701 the second transmit power may include determining the second transmit power to be smaller than the maximum transmit power of the BS when the first transmit power is equal to the maximum transmit power of the BS.

According to an embodiment of the disclosure, determining by the processor 1701 the type of the second subframe may include determining a subframe equal in length to the first subframe to be the second subframe when the first transmit power is smaller than the maximum transmit power of the BS, and determining by the processor 1701 the second transmit power may include determining the second transmit power to be equal to the maximum transmit power of the BS when the first transmit power is smaller than the maximum transmit power of the BS.

According to an embodiment of the disclosure, determining by the processor 1701 the type of the second subframe may include performing a back-off operation for the second channel when the second point is earlier than the first point, calculating a point at which the back-off operation is completed, and determining the type of the second subframe based on the calculated point.

According to an embodiment of the disclosure, determining by the processor 1701 the type of the second subframe may include predicting a point at which a busy state of the second channel is terminated when the first point is earlier than the second point, performing a back-off operation for the second channel, calculating a point at which the back-off operation is completed, and determining the type of the second subframe based on the predicted point and the calculated point.

According to an embodiment of the disclosure, predicting by the processor 1701 the point at which a busy state of the second channel is terminated may include predicting a point at which the busy state of the second channel is terminated based on an MCOT or information about transmission length of the second channel when the type of the wireless communication system is LTE-LAA, and predicting a point at which the busy state of the second channel is terminated based on an L-SIG when the type of the wireless communication system is Wi-Fi.

According to an embodiment of the disclosure, determining by the processor 1701 the type of the second subframe may include determining one of an ending partial subframe and a punctured partial subframe when the type of the wireless communication system is LTE-LAA.

The processor 1701 may check information about a state of the second channel. Determining by the processor 1701 the type of the second subframe may include determining, based on the information about a state of the second channel, length of the second subframe to be less than a certain value when the number of collisions on the second channel is higher than a certain value.

In an embodiment of the disclosure, the processor 1701 may determine a type of a first reservation signal for occupancy of the first channel and a type of a second reservation signal for occupancy of the second channel, transmitting the first reservation signal in the first channel before transmitting a third frame, and transmitting the second reservation signal in the second channel before transmitting a fourth subframe.

In an embodiment of the disclosure, the transceiver 1703 may transmit or receive data in the occupied channels as described above.

In an embodiment of the disclosure, the memory 1705 may store at least one of information transceived by the transceiver 1703 or information generated by the processor 1701.

Figure 18:
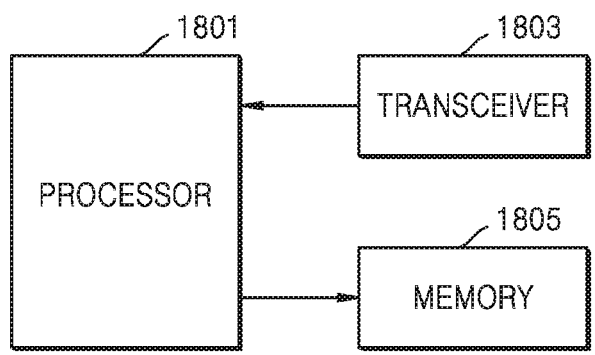
FIG. 18 illustrates a block diagram of UE, according to an embodiment of the disclosure.

FIG. 18 illustrates a block diagram of a UE, according to an embodiment of the disclosure.

Referring to FIG. 18, the UE may include a processor 1801, a transceiver 1803, and a memory 1805.

In the embodiment of the disclosure, the processor 1801 may be defined to be a circuit, an ASIC, or at least one processor. The processor 1801 may control general operation of the UE according to embodiments of the disclosure.

In an embodiment of the disclosure, the processor 1801 may control overall operation for uplink transmission of the UE as described above in connection with FIGS. 12 and 13.

In an embodiment of the disclosure, the transceiver 1803 may transmit or receive data in the occupied channels as described above.

In an embodiment of the disclosure, the memory 1805 may store at least one of information transceived by the transceiver 1803 or information generated by the processor 1801.

Methods according to the claims of the disclosure or the embodiments described in the specification may be implemented in hardware, software, or a combination of hardware and software.

When implemented in software, a computer-readable storage medium storing one or more programs (software modules) may be provided. One or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a Local Area Network (LAN), a wide LAN (WLAN), or a storage area network (SAN), or a combination thereof. The storage device may be connected to an apparatus performing the embodiments of the disclosure through an external port. In addition, a separate storage device in the communication network may be connected to the apparatus performing the embodiments of the disclosure.

Several embodiments of the disclosure have thus been described, but it will be understood that various modifications can be made without departing the scope of the disclosure. Thus, it will be apparent to those of ordinary skill in the art that the disclosure is not limited to the embodiments described, but can encompass not only the appended claims but the equivalents.

The block diagrams as described herein may be construed by those of ordinary skill in the art as conceptual representation of circuitry for implementing the principles of the disclosure. It is also understood by those of ordinary skill in the art that any flow charts, flow diagrams, state transitions, pseudo codes, etc., may be substantially embodied in a computer-readable medium as various processes that may be carried out by a computer or processor, whether explicitly shown or not. Accordingly, the aforementioned embodiments of the disclosure may be written into a program that may be executed by a computer, and may be implemented in a universal digital computer for carrying out the program using a computer-readable recording medium. The computer-readable recording medium includes a storage medium, such as magnetic storage medium (e.g., ROM, floppy disk, hard disk, etc.), an optical medium (e.g., CD-ROM, DVD, etc.), etc.

Functions of the various elements shown in the drawings may be associated with appropriate software and thus provided by the use of dedicated hardware as well as hardware capable of executing the software. When provided by a processor, the functions may be provided by a single dedicated processor, a single shared processor, or a plurality of individual processors, some of which may be shared. Also, the explicit use of the term "processor" or "controller" should not be interpreted as making exclusive reference to hardware capable of executing software, but may be construed as implicitly including, without limitation, a digital signal processor (DSP), a ROM for storing software, a RAM, and a non-volatile storage device.

In the attached claims, an element represented as a means for performing a particular function encompasses any method of performing the particular function, the element being intended to encompass a combination of circuit elements that perform the particular function, or any form of software including firmware, microcode, etc., in combination with circuitry suitable for carrying out the software to perform the particular function.

Throughout the specification, reference to "an embodiment" of principles of the disclosure and various modifications thereof intends that particular properties, structures, features, etc., are included in at least one embodiment of the principle of the disclosure. Thus, the term "an embodiment" and any other modifications thereof do not necessarily refer to the same embodiment of the disclosure.

Throughout the disclosure, the expression "at least one of a or b" indicates only a, only b, both a and b. Additionally, throughout the disclosure, the expression "at least one of a, b or c" indicates only a, only b, only c, both a and b, both a and c, both b and c, all of a, b, and c, or variations thereof. Even if more items are enumerated, they may be clearly and expansively interpreted by those of ordinary skill in the art.

The disclosure has been described with reference to the embodiments thereof.

It is to be understood that all embodiments of the disclosure and conditional exemplification as disclosed herein are intended to assist those of ordinary skill in the art in understanding the principles and concepts of the disclosure, and thus those of ordinary skilled in the art may understand that the embodiments of the disclosure may be modified without departing from the substantial characteristics of the disclosure. Therefore, the disclosed embodiments should be considered in an illustrative sense rather than a restrictive sense. The scope of the disclosure is defined only by the following claims, and all the equivalents of the embodiments may also be construed to be in the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of occupying a channel in a wireless communication system that supports an unlicensed band, the method comprising:
   detecting an earlier point among a first point that transmission of a first subframe in a first channel is completed and a second point that a busy state of a second channel is terminated;
   determining a type of a second subframe based on a result of the detecting and a first transmit power for the first channel;
   transmitting the second subframe of the determined type in the first channel after transmission of the first subframe is completed;
   determining a second transmit power based on the first transmit power for the first channel; and
   transmitting a third subframe in the first channel and a fourth subframe in the second channel at the second transmit power, after transmission of the second subframe is completed,
   wherein the determining of the type of the second subframe comprises:
      determining a subframe shorter than the first subframe to be the second subframe based on the first transmit power being equal to a maximum transmit power of a base station, and
   wherein the determining of the second transmit power comprises:
      determining the second transmit power to be smaller than the maximum transmit power of the base station based on the first transmit power being equal to the maximum transmit power of the base station.

2. The method of claim 1, wherein:
   the determining of the type of the second subframe comprises:
      determining a subframe equal in length to the first subframe to be the second subframe based on the first transmit power being smaller than a maximum transmit power of a base station, and
   the determining of the second transmit power comprises:
      determining the second transmit power to be equal to the first transmit power based on the first transmit power being smaller than the maximum transmit power of the base station.

3. The method of claim 1, wherein the determining of the type of the second subframe comprises:
   performing a back-off operation for the second channel based on the second point being earlier than the first point,
   calculating a point at which the back-off operation is completed, and
   determining the type of the second subframe based on the calculated point.

4. The method of claim 1, wherein the determining of the type of the second subframe comprises:
   predicting a point at which the busy state of the second channel is terminated based on the first point being earlier than the second point,
   performing a back-off operation for the second channel,
   calculating a point at which the back-off operation is completed, and
   determining the type of the second subframe based on the predicted point and the calculated point.

5. The method of claim 4, wherein the predicting of the point at which the busy state of the second channel is terminated comprises:
   predicting the point at which the busy state of the second channel is terminated based on a maximum channel occupancy time (MCOT) or transmission length information of the second channel based on the wireless communication system being long term evolution licensed assistant access (LTE-LAA), and
   predicting the point at which the busy state of the second channel is terminated using a legacy signal (L-SIG) based on the wireless communication system being wireless fidelity (Wi-Fi).

6. The method of claim 1, wherein the determining of the type of the second subframe comprises determining one of an ending partial subframe and a punctured partial subframe based on the wireless communication system being LTE-LAA.

7. The method of claim 1, further comprising:
   checking information about a state of the second channel,
   wherein the determining of the type of the second subframe comprises determining, based on the information about the state of the second channel, a length of the second subframe to be less than a certain value based on a number of collisions in the second channel being higher than a certain value.

8. The method of claim 1, further comprising:
   determining a type of a first reservation signal to occupy the first channel and a type of a second reservation signal to occupy the second channel; and
   transmitting the first reservation signal in the first channel before transmitting the third subframe and transmitting the second reservation signal in the second channel before transmitting the fourth subframe.

9. A base station, for transmitting or receiving data in a wireless communication system that supports an unlicensed band, the base station comprising:
   a transceiver; and
   at least one processor coupled with the transceiver and configured to:
      detect an earlier point among a first point at which transmission of a first subframe in a first channel is completed and a second point at which a busy state of a second channel is terminated;

determine a type of a second subframe based on a result of the detecting and a first transmit power for the first channel;

transmit the second subframe of the determined type in the first channel after transmission of the first subframe is completed;

determine a second transmit power based on the first transmit power for the first channel; and transmit a third subframe in the first channel and a fourth subframe in the second channel at the second transmit power, after transmission of the second subframe is completed, wherein the at least one processor is further configured to:

determine a subframe shorter than the first subframe to be the second subframe based on the first transmit power being equal to a maximum transmit power of a base station, and determine the second transmit power to be smaller than the maximum transmit power of the base station based on the first transmit power being equal to the maximum transmit power of the base station.

10. The base station of claim 9, wherein the at least one processor is further configured to:

determine a subframe equal in length to the first subframe to be the second subframe based on the first transmit power being smaller than a maximum transmit power of the base station, and determine the second transmit power to be equal to the first transmit power based on the first transmit power being smaller than the maximum transmit power of the base station.

11. The base station of claim 9, wherein the at least one processor is further configured to:

perform a back-off operation for the second channel based on the second point being earlier than the first point, calculate a point at which the back-off operation is completed, and determine the type of the second subframe based on the calculated point.

12. The base station of claim 9, wherein the at least one processor is further configured to:

predict a point at which the busy state of the second channel is terminated based on the first point being earlier than the second point, perform a back-off operation for the second channel, calculate a point at which the back-off operation is completed, and determine the type of the second subframe based on predicted point and the calculated point.

13. The base station of claim 12, wherein the at least one processor is further configured to:

predict the point at which the busy state of the second channel is terminated based on a maximum channel occupancy time (MCOT) or transmission length information of the second channel, based on the wireless communication system being long term evolution licensed assistant access (LTE-LAA), and predict the point at which the busy state of the second channel is terminated using a legacy signal (L-SIG) based on the wireless communication system being wireless fidelity (Wi-Fi).

14. The base station of claim 9, wherein the at least one processor is further configured to determine one of an ending partial subframe and a punctured partial subframe based on the wireless communication system being LTE-LAA.

15. The base station of claim 9, wherein the at least one processor is further configured to:

check information about a state of the second channel, and determine, based on the information about the state of the second channel, a length of the second subframe to be less than a certain value based on a number of collisions in the second channel being higher than a certain value.

16. The base station of claim 9, wherein the at least one processor is further configured to:

determine a type of a first reservation signal to occupy the first channel and a type of a second reservation signal to occupy the second channel, and transmit the first reservation signal in the first channel before transmitting the third subframe and transmit the second reservation signal in the second channel before transmitting the fourth subframe.

* * * * *